United States Patent
Zhang et al.

(10) Patent No.: US 11,425,387 B2
(45) Date of Patent: *Aug. 23, 2022

(54) SIMPLIFIED LOCAL ILLUMINATION COMPENSATION

(71) Applicant: QUALCOMM Incorporated, San Diego, CA (US)

(72) Inventors: Kai Zhang, San Diego, CA (US); Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/926,337

(22) Filed: Jul. 10, 2020

(65) Prior Publication Data

US 2020/0344482 A1 Oct. 29, 2020

Related U.S. Application Data

(63) Continuation of application No. 16/268,939, filed on Feb. 6, 2019, now Pat. No. 10,715,810.

(Continued)

(51) Int. Cl.
*H04N 19/105* (2014.01)
*H04N 19/132* (2014.01)
(Continued)

(52) U.S. Cl.
CPC ......... *H04N 19/132* (2014.11); *H04N 19/105* (2014.11); *H04N 19/136* (2014.11);
(Continued)

(58) Field of Classification Search
CPC .. H04N 19/105; H04N 19/132; H04N 19/136; H04N 19/176; H04N 19/186; H04N 19/573; H04N 19/593
See application file for complete search history.

(56) References Cited

U.S. PATENT DOCUMENTS 9,807,424 B2 10/2017 Guo et al.
10,715,810 B2 7/2020 Zhang et al.
(Continued)

OTHER PUBLICATIONS

Bordes (Technicolor) P et al: "CE4-related: LIC with Reduced Memory Buffer," 124. MPEG Meeting; Oct. 8, 20181008-Oct. 12, 2018; Macao; (Motion Picture Expert Group or ISO/IEC JTC1/SC29/WG11), No. m44223, Sep. 24, 2018 (Sep. 24, 2018), XP030190883, pp. 1-4, Retrieved from the Internet: URL:http://phenix.int-evry.fr/mpeg/doc_end_user/documents/124_Macao/wg11/m44223-JVET-L0203-v1-JVET-L0203... JVET-L0203-LIC_simplification-v1.docx [retrieved on Sep. 24, 2018].

(Continued)

*Primary Examiner* — Anner N Holder
(74) *Attorney, Agent, or Firm* — Shumaker & Sieffert, P.A.

(57) ABSTRACT

A method of processing video data includes determining, by processing circuitry, a plurality of neighboring samples for predicting a current block. The plurality of neighboring samples are arranged outside of a region of a current picture, the region comprising the current block, a row of samples adjacent to a top row of the current block, and a column of samples adjacent to a left column of the current block. The method further comprises deriving, by the processing circuitry, local illumination compensation information for the current block using the plurality of neighboring samples and generating, by the processing circuitry, a prediction block using the local illumination compensation information.

20 Claims, 23 Drawing Sheets

Related U.S. Application Data

(60) Provisional application No. 62/632,969, filed on Feb. 20, 2018.

(51) Int. Cl.

| | | |
|---|---|---|
| *H04N 19/136* | (2014.01) | |
| *H04N 19/176* | (2014.01) | |
| *H04N 19/186* | (2014.01) | |
| *H04N 19/573* | (2014.01) | |
| *H04N 19/593* | (2014.01) | |

(52) U.S. Cl.
CPC ......... *H04N 19/176* (2014.11); *H04N 19/186* (2014.11); *H04N 19/573* (2014.11); *H04N 19/593* (2014.11)

(56) References Cited

U.S. PATENT DOCUMENTS

| | | | |
|---|---|---|---|
| 2009/0052529 A1 | 2/2009 | Kim et al. | |
| 2010/0183068 A1 | 7/2010 | Pandit et al. | |
| 2011/0286678 A1 | 11/2011 | Shimizu et al. | |
| 2013/0128974 A1 | 5/2013 | Chien et al. | |
| 2013/0182768 A1 | 7/2013 | Jeong et al. | |
| 2013/0243085 A1 | 9/2013 | Kovliga et al. | |
| 2014/0010305 A1 | 1/2014 | Mironovich et al. | |
| 2014/0139627 A1* | 5/2014 | Chen .................... | H04N 19/176 348/43 |
| 2014/0177712 A1* | 6/2014 | Fartukov ............... | H04N 19/117 375/240.12 |
| 2016/0134869 A1* | 5/2016 | Ikai ....................... | H04N 19/136 382/166 |
| 2016/0366415 A1 | 12/2016 | Liu et al. | |
| 2016/0366416 A1 | 12/2016 | Liu et al. | |
| 2017/0339405 A1 | 11/2017 | Wang et al. | |
| 2017/0347103 A1 | 11/2017 | Yu et al. | |
| 2018/0103273 A1 | 4/2018 | Guo et al. | |
| 2018/0176587 A1 | 6/2018 | Panusopone et al. | |
| 2019/0110083 A1 | 4/2019 | Panusopone et al. | |
| 2019/0141318 A1 | 5/2019 | Li et al. | |
| 2019/0166370 A1 | 5/2019 | Xiu et al. | |
| 2019/0200021 A1 | 6/2019 | Park et al. | |
| 2019/0253722 A1 | 8/2019 | Panusopone et al. | |
| 2019/0260996 A1 | 8/2019 | Zhang et al. | |

OTHER PUBLICATIONS

Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-d2, 43 pages.

Bross B., et al., "Versatile Video Coding (Draft 3)", Joint Video Experts Team (JVET) of ITU-T SG 16 WP 3 and ISO/IEC JTC 1/SC 29/WG 11,12th Meeting: Macao, CN, JVET-L1001-v3, Oct. 3-12, 2018, 181 pages.

Chen J., et al., "Algorithm description for Versatile Video Coding and Test Model 1 (VTM 1)", Joint Video Exploration Learn (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm Description for Versatile Video Coding and Test Model 3 (VTM 3)", 12, JVET Meeting, Oct. 3, 2018-Oct. 12, 2018, Macao, (The Joint Video Exploration Team of ISO/IEC JTC1/SC29/WG11 and ITU-T SG.16, JVET-L1002, Dec. 3, 2018 (Dec. 3, 2018), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3 2.5], paragraph [3.9.1].

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, Jun. 6, 2016, 37 Pages.

Chiu Y-J., et al., "Decoder-side Motion Estimation and Wiener Filter for HEVC", 2013 Visual Communications and Image Processing (VCIP), IEEE, Nov. 17, 2013 (Nov. 17, 2013), pp. 1-6, XP032543658, DOI: 10.1109/VCIP.2013.6706446 [retrieved on Jan. 8, 2014].

Fujibayashi A., et al., "TE12: Performance of Partition Based Illumination Compensation (PBIC)", 3rd JCT-VC Meeting, 94th MPEG Meeting, Jul. 10, 2010-Oct. 15, 2010, Guangzhou, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-S041, Oct. 1, 2010 (Oct. 1, 2010), XP030007748, pp. 1-12, Section 2.

International Search Report and Written Opinion—PCT/US2019/017070—ISA/EPO—dated Apr. 2, 2019.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of audiovisual services—Coding of moving Video, Advanced video coding for generic audiovisual services, The International Telecommunication Union. Jun. 2011, 674 pp.

ITU-T H.265, "Series H: Audiovisual and Multimedia Systems, Infrastructure of Audiovisual Services—Coding of Moving Video, High efficiency Video Coding," The International Telecommunication Union Dec. 2016, 664 Pages.

"ITU-T H.265, Series H: Audiovisual and Multimedia Systems, Infrastructure of audiovisual services—Coding of moving Video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

ITU-T Rec. H.261 (Dec. 1990), "Line Transmission on Non-Telephone Signals, Video Codec for Audiovisual Services AT p x 64 kbit/s", 32 Pages.

Kamp S., et al., "Decoder Side Motion Vector Derivation", 82. MPEG Meeting, Oct. 22, 2007-Oct. 26, 2007, Shenzhen, (Motion Picture Expert Group or ISO/IEC JTC1/SC29/WG11), No. M14917, Oct. 16, 2007 (Oct. 16, 2007), pp. 1-24, XP030043523, the whole document.

Kim U.S., et al., "New Frame Rate Up-Conversion Algorithms With Low Computational Complexity", IEEE Transactions on circuits and systems for video technology, Mar. 2014, vol. 24, No. 3, pp. 384-393.

Lee W.H., et al., "Frame Rate Up Conversion Based on Variational Image Fusion", IEEE Transactions on Image processing, Jan. 2014, vol. 23, No. 1, pp. 399-412.

Liu H., et al., "Local Illumination Compensation", 52. VCEG Meeting, Jun. 19, 2015-Jun. 26, 2015, Warsaw, (Video Coding Experts Group of ITU-T SG.16), No. VCEG-AZ06_r1, Jun. 25, 2015 (Jun. 25, 2015), XP030003884, 4 Pages.

Liu H., et al., "3D-CE1.h Related: Illumination Compensation for Inter-View Prediction", 1. JCT-3V Meeting; 101.MPEG Meeting; Jul. 16, 2012-Jul. 20, 2012; Stockholm; SE (The Joint Collaborative Team on 3D Video Coding Extension Development of ISO/IEC JTC1/SC29/WG11 and ITU-T SG.16 WP 3), URL: http://phenix.int-evry.fr/jct2/, No. JCT3V-A0086, Jul. 11, 2012 (Jul. 11, 2012), XP030130085, pp. 1-7, Section 2.

Liu H., et al., "Multiple Hypotheses Bayesian Frame Rate Up-Conversion by Adaptive Fusion of Motion-Compensated Interpo-

(56) References Cited

OTHER PUBLICATIONS lations", IEEE transactions on Circuits and Systems for Video Technology, Aug. 2012, vol. 22, No. 8, pp. 1188-1198.
Tech G., et al., "3D-HEVC Draft Text 7," Joint Collaborative Team on 3D Video Coding Extensions of ITU-T SG 16 WP 3 and ISO/IEC JTC 1/SC 29/WG 11, Feb. 12-18, 2015, Document: JCT3V-K1001-v7, 113 pp.
Prosecution History for U.S. Appl. No. 16/268,939 dated from Nov. 29, 2019 through Mar. 17, 2020, 39 pages.

* cited by examiner

Reference block

Current CU

SIMPLIFIED LOCAL ILLUMINATION COMPENSATION

This application is a continuation application of U.S. patent application Ser. No. 16/268,939, filed on Feb. 6, 2019, which claims the benefit of U.S. Provisional Patent Application 62/632,969, filed on Feb. 20, 2018, the entire content of both of which are hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to an improvement on the local illumination compensation in block-based video coding. For example, a video coder (e.g., video encoder or video decoder) may be configured to determine neighboring samples that will be immediately available for deriving local illumination compensation information for the current block. In this way, the video coder may more quickly derive local illumination compensation information compared to systems that wait for samples immediately adjacent to the current block to be available. One or more techniques described herein for local illumination compensation, may be applied to any of the existing video codecs, such as HEVC (High Efficiency Video Coding) or H.266/Versatile Video Coding (VVC) standard, or be may be used in any future video coding standards.

In one example, a method of processing video data includes: determining, by processing circuitry, a plurality of neighboring samples for predicting a current block, wherein the plurality of neighboring samples are arranged outside of a region of a current picture, the region comprising the current block, a row of samples adjacent to a top row of the current block, and a column of samples adjacent to a left column of the current block; deriving, by the processing circuitry, local illumination compensation information for the current block using the plurality of neighboring samples; and generating, by the processing circuitry, a prediction block using the local illumination compensation information.

In another example, an apparatus for processing video data includes one or more storage media; and one or more processors configured to: determine a plurality of neighboring samples for predicting a current block, wherein the plurality of neighboring samples are arranged outside of a region of a current picture, the region comprising the current block, a row of samples adjacent to a top row of the current block, and a column of samples adjacent to a left column of the current block; derive local illumination compensation information for the current block using the plurality of neighboring samples; and generate a prediction block using the local illumination compensation information.

In another example, a device for processing video data includes means for determining a plurality of neighboring samples for predicting a current block, wherein the plurality of neighboring samples are arranged outside of a region of a current picture, the region comprising the current block, a row of samples adjacent to a top row of the current block, and a column of samples adjacent to a left column of the current block; means for deriving local illumination compensation information for the current block using the plurality of neighboring samples; and means for generating a prediction block using the local illumination compensation information.

In another example, a computer-readable storage medium is encoded with instructions that, when executed, cause a programmable processor to: determine a plurality of neighboring samples for predicting a current block, wherein the plurality of neighboring samples are arranged outside of a region of a current picture, the region comprising the current block, a row of samples adjacent to a top row of the current block, and a column of samples adjacent to a left column of the current block; derive local illumination compensation information for the current block using the plurality of neighboring samples; and generate a prediction block using the local illumination compensation information.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 8A is a conceptual diagram illustrating a first section in an example prediction unit (PU) OBMC.

FIG. 8B is a conceptual diagram illustrating a second section in an example PU OBMC.

DETAILED DESCRIPTION

In general, this disclosure describes techniques related to improvements to the local illumination compensation (LIC) in block-based video coding. Such techniques may be applied to current or future video coding standards, including the Versatile Video Coding (VVC) standard presently under development.

When applying LIC techniques, a video coder (e.g., a video encoder, a video decoder, etc.) may access neighboring reconstructed samples adjacent to a current block. In some hardware architecture, these samples may not yet have been reconstructed (e.g., when the current block is conducting motion compensation), and thus, may be unavailable. In this case, the motion compensation procedure of the current block may be delayed until the video coder reconstructs the neighboring samples, resulting in an undesirable delay in the timeline.

In accordance with techniques described herein, a video coder may be configured to determine neighboring samples for predicting a current block that are arranged outside of a region. The region may include the current block, a row of samples adjacent to a top row of the current block, and a column of samples adjacent to a left column of the current block. In this way, the video coder may help to ensure that the neighboring samples will be available (e.g., not blocked, delayed, etc.) such the video coder may immediately perform a motion compensation procedure of the current block. In this way, the video coder may improve a processing speed of the video coder and/or reduce a power consumption of the video coder.

Various techniques in this disclosure may be described with reference to a video coder or with reference to video coding, which are intended to be generic terms that can refer to either a video encoder and video encoding or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

Figure 1:
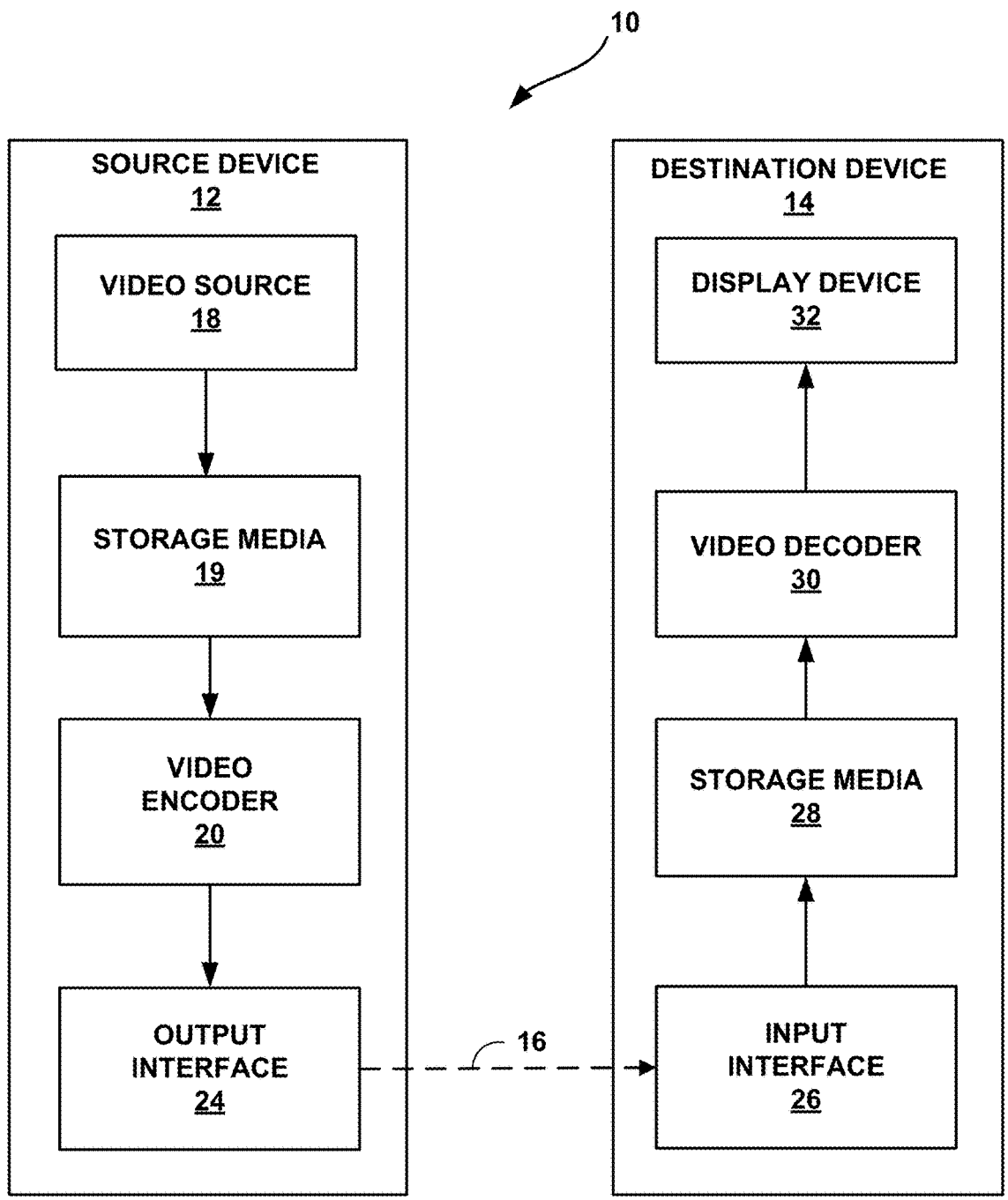
FIG. 1 is a block diagram illustrating an example video encoding and decoding system that may utilize one or more techniques described in this disclosure.

FIG. 1 is a block diagram illustrating an example video encoding and decoding system 10 that may utilize the LIC techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 may represent a wireless communication device configured to store video data in a memory (e.g., storage media 19), process the video data on one or more processors, and transmit the video data from a transmitter (e.g., output interface 24). Examples of a wireless communication device may include, but is not limited to, a telephone handset. In some examples, transmitting the video data at the transmitter of the wireless communication device may comprises modulating, according to a wireless communication standard, a signal comprising the video data. Video decoder 30 may represent a wireless communication device configured to receive video data at a receiver (e.g., input interface 26), store the video data in a memory (e.g., storage media 28), process the video data on one or more processors, and output decided video data (e.g., to display device 32). In some examples, receiving the video data at the receiver of the wireless communication device may comprises demodulating, according to a wireless communication standard, a signal comprising the video data.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). In 2016, MPEG and ITU-T VCEG formed a joint exploration video team (JVET) to explore new coding tools for the next generation of video coding standard. The reference software is called JEM (joint exploration model).

In 2016, MPEG and ITU-T VCEG formed a joint exploration video team (JVET) to explore new coding tools for the next generation of video coding standard. The reference software is called JEM (joint exploration model).

An early draft for new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)." Video encoder 20 and video decoder 30 may operate according to any video coding standard, such as HEVC, VVC, proprietary or other industry standards, such as the Joint Exploration Test Model (JEM), etc. The techniques of this disclosure, however, are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may encode blocks of a picture of the video data. Video encoder 20 may include, in a bitstream, an encoded representation of the video block. For example, in HEVC, to generate an encoded representation of a picture, video encoder 20 may generate a set of coding tree units (CTUs). Each of the CTUs may comprise one or more coding tree blocks (CTBs) and may comprise syntax structures used to code the samples of the one or more coding tree blocks. For instance, each a CTU may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). A syntax structure may be defined as zero or more syntax elements present together in the bitstream in a specified order. The size of a CTB can range from 16×16 to 64×64 in the HEVC main profile (although technically 8×8 CTB sizes can be supported).

In HEVC, a slice includes an integer number of CTUs ordered consecutively in a raster scan order. Thus, in HEVC, the largest coding unit in a slice is called a coding tree block (CTB).

In HEVC, to generate a coded CTU of a picture, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise one or more coding blocks and syntax structures used to code samples of the one or more coding blocks. For example, a CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. Thus, a CTB may contain a quad-tree, the nodes of which are CUs.

Furthermore, video encoder 20 may encode a CU. For instance, to encode a CU, video encoder 20 may partition a coding block of a CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Figure 3B:
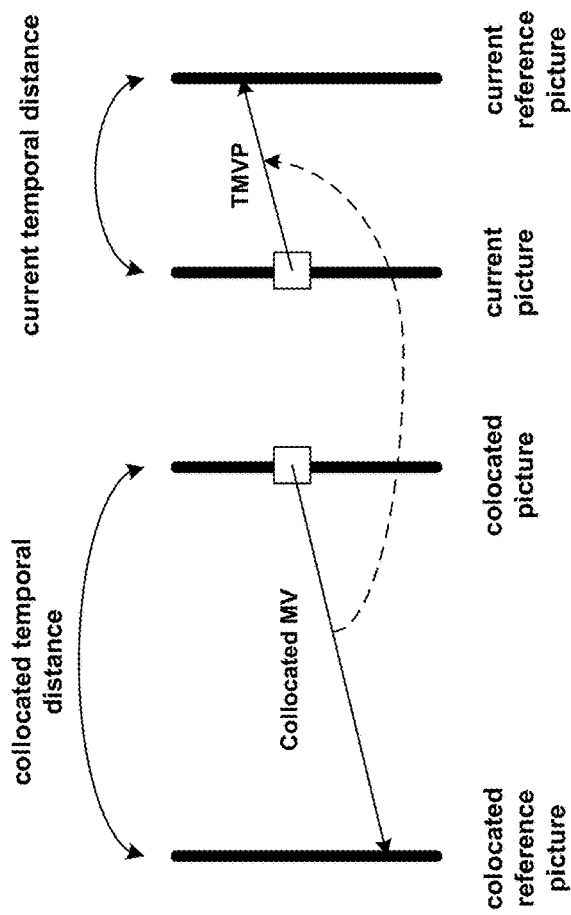
FIG. 3B is a conceptual diagram illustrating example motion vector scaling.

In HEVC, each CU is coded with one mode, which could be either intra mode or inter mode. When a CU is inter coded (i.e., inter mode is applied), the CU may be further partitioned into 2 or 4 PUs or become just one PU when further partitioning does not apply. When two PUs are present in one CU, the two PUs can be half size rectangles or two rectangle sizes with ¼ or ¾ size of the CU. There are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N, as shown in FIG. 3. While an example using H.264/AVC is used, other examples may use other standards, such as, but not limited to, the VVC standard.

When the CU is inter coded, one set of motion information is present for each PU. In addition, each PU is coded with a unique inter-prediction mode to derive the set of motion information. If video encoder 20 uses intra prediction to generate the predictive blocks of a PU, video encoder 20 may generate the predictive blocks of the PU based on decoded samples of the picture that includes the PU. When a CU is intra coded, 2N×2N and N×N are the only permissible PU shapes, and within each PU a single intra prediction mode is coded (while chroma prediction mode is signalled at CU level). The N×N intra PU shapes are only allowed when the current CU size is equal to the smallest CU size defined in a sequence parameter set (SPS).

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Examples of JEM/VVC provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

Figure 4A:
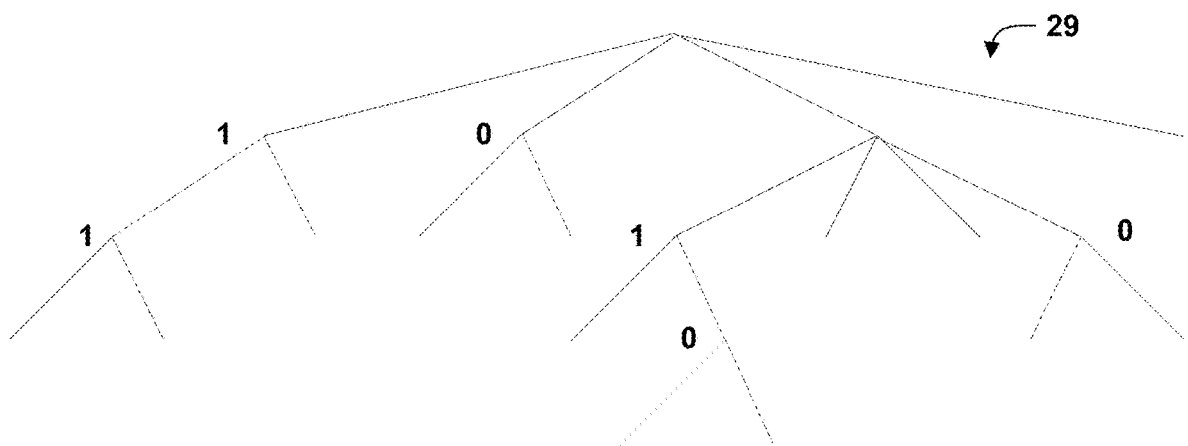
FIGS. 4A and 4B are conceptual diagrams illustrating an example quadtree binary tree (QTBT) structure, and a corresponding coding tree unit (CTU).
Figure 4B:
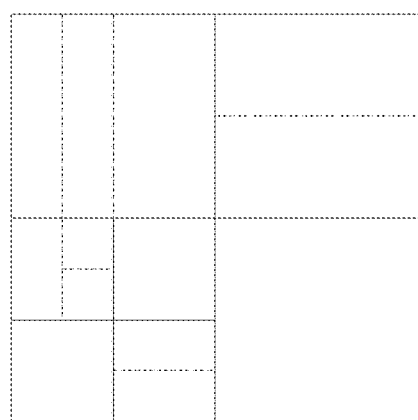

FIGS. 4A and 4B are conceptual diagrams illustrating an example quadtree binary tree (QTBT) structure 29, and a corresponding coding tree unit (CTU) 31. A video encoder may apply the concepts illustrated in FIGS. 4A and 4B to generate video data to be entropy encoded in a bitstream. In some examples, a video decoder may apply the concepts illustrated in FIGS. 4A and 4B to entropy decode video data in a bitstream. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 29 (i.e., the solid lines) and syntax elements (such as splitting information) for a prediction tree level of QTBT structure 29 (i.e., the dashed lines). Video encoder 20 may encode, and video decoder 30 may decode, video data, such as prediction and transform data, for CUs represented by terminal leaf nodes of QTBT structure 29.

In general, CTU 31 of FIG. 4B may be associated with parameters defining sizes of blocks corresponding to nodes of QTBT structure 29 at the first and second levels. These parameters may include a CTU size (representing a size of CTU 31 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes encoded video data. For example, the bitstream may comprise a sequence of bits that forms a representation of coded pictures of the video data and associated data. Thus, the bitstream comprises an encoded representation of video data. In some examples, a representation of a coded picture may include encoded representations of blocks. Thus, video encoder 20 may signal, in the bitstream, transform coefficients of a block in an encoded representation of the block. In some instances, video encoder 20 may use one or more syntax elements to signal each transform coefficient of the block.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The following video coding techniques may be performed by source device 12 and destination device 14. More specifically, the following video coding techniques may be performed by video encoder 20 of source device 12 and video decoder 30 of destination device 14.

For each block, a set of motion information may be available. A set of motion information may include motion information for forward and backward prediction directions.

In this example, forward and backward prediction directions may be two prediction directions of a bi-directional prediction mode and the terms "forward" and "backward" may not have a geometry meaning. For example, the terms "forward" and "backward" may correspond to reference picture list 0 (RefPicList0) and reference picture list 1 (RefPicList1) of a current picture. When only one reference picture list is available for a picture or slice, only RefPicList0 may be available and the motion information of each block of a slice may be forward.

In some examples, video decoder 30 may use a motion vector together with the motion vector's reference index in decoding processes, such a motion vector with the associated reference index is denoted as a uni-predictive set of motion information.

For each prediction direction, the motion information may include a reference index and a motion vector. In some cases, for simplicity, a motion vector itself may be referred to as having an associated reference index. Video encoder 20 and/or video decoder 30 may use a reference index may to identify a reference picture in the current reference picture list (RefPicList0 or RefPicList1). A motion vector may have a horizontal and a vertical component.

Video encoder 20 and/or video decoder 30 may use picture order count (POC) in video coding standards to identify a display order of a picture. Although there are cases two pictures within one coded video sequence may have the same POC value, such cases typically do not happen within a coded video sequence. When multiple coded video sequences are present in a bitstream, pictures with a same value of POC may be closer to each other in terms of decoding order.

Video encoder 20 and/or video decoder 30 may use POC values of pictures for reference picture list construction, derivation of reference picture set as in HEVC, and motion vector scaling.

In H.264/AVC, video encoder 20 and/or video decoder 30 may partition each inter macroblock (MB) into the following four different ways: (1) 16×16 MB partition; (2) 16×8 MB partitions; (3) 8×16 MB partitions; and (4) 8×8 MB partitions. Different MB partitions in one MB may have different reference index values for each direction (RefPicList0 or RefPicList1). When an MB is not partitioned into four 8×8 MB partitions, the MB may have only one motion vector for each MB partition in each direction.

When an MB is partitioned into four 8×8 MB partitions, video encoder 20 and/or video decoder 30 may further partition each 8×8 MB partition into sub-blocks, each of which can have a different motion vector in each direction. For example, video encoder 20 and/or video decoder 30 may get sub-blocks from an 8×8 MB partition: (1) 8×8 sub-block; (2) 8×4 sub-blocks; (3) 4×8 sub-blocks; and (4) 4×4 sub-blocks. Each sub-block may have a different motion vector in each direction. Therefore, a motion vector may be present in a level equal to higher than sub-block.

In AVC, video encoder 20 and/or video decoder 30 may enable temporal direct mode in either a MB or a MB partition level for skip or direct mode in B slices. For each MB partition, video encoder 20 and/or video decoder 30 may use the motion vectors of the block co-located with the current MB partition in the RefPicList1[0] of the current block to derive the motion vectors. Video encoder 20 and/or video decoder 30 may scale each motion vector in the co-located block based on POC distances. In AVC, a direct mode can also predict motion information from the spatial neighbors.

In HEVC, the largest coding unit in a slice is called a coding tree block (CTB). A CTB includes a quad-tree the nodes of which are coding units. The size of a CTB may range from 16×16 to 64×64 in the HEVC main profile (although technically 8×8 CTB sizes may be supported). A coding unit (CU) may be the same size of a CTB although and as small as 8×8. Video encoder 20 and/or video decoder 30 may code each coding unit with one mode. When a CU is inter coded, video encoder 20 and/or video decoder 30 may further partition the CU into 2 or 4 prediction units (PUs) or cause the CU to become just one PU when further partitioning does not apply. When two PUs are present in one CU, they can be half size rectangles or two rectangle size with ¼ or ¾ size of the CU.

When the CU is inter coded, one set of motion information is present for each PU. In addition, video encoder 20 and/or video decoder 30 may code each PU with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU).

In either AMVP or merge mode, video encoder 20 and/or video decoder 30 may maintain a motion vector (MV) candidate list for multiple motion vector predictors. The motion vector(s), as well as reference indices in the merge mode, of the current PU are generated by taking one candidate from the MV candidate list. The MV candidate list may include up to 5 candidates for the merge mode and only two candidates for the AMVP mode. A merge candidate may include a set of motion information, e.g., motion vectors corresponding to both reference picture lists (list 0 and list 1) and the reference indices. If a merge candidate is identified by a merge index, video encoder 20 and/or video decoder 30 may use the reference pictures for the prediction of the current blocks, as well as the associated motion vectors are determined. However, under AMVP mode for each potential prediction direction from either list 0 or list 1, video encoder 20 may explicitly signal a reference index, together with an MVP index to the MV candidate list since the AMVP candidate may include only a motion vector. In AMVP mode, the predicted motion vectors can be further refined.

As can be seen above, a merge candidate may correspond to a full set of motion information while an AMVP candidate may include just one motion vector for a specific prediction direction and reference index. Video encoder 20 and/or video decoder 30 may derive the candidates for both modes similarly from the same spatial and temporal neighboring blocks.

Figure 2B:
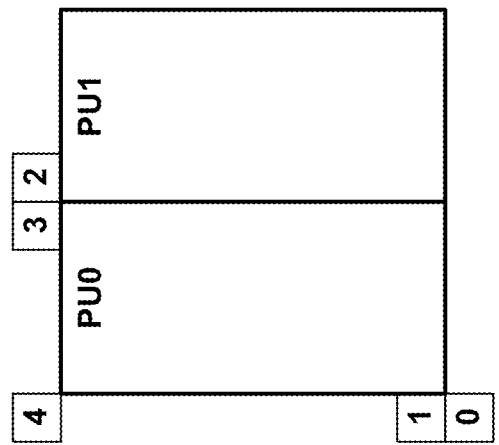
FIG. 2B is a conceptual diagram illustrating example spatial neighboring MV candidates for advanced motion vector prediction (AMVP) mode.
Figure 2A:
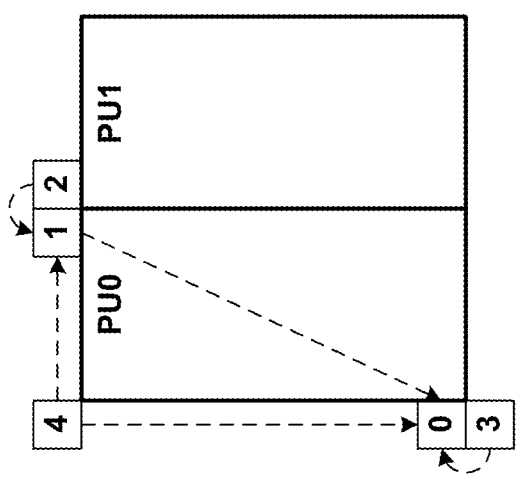
FIG. 2A is a conceptual diagram illustrating example spatial neighboring motion vector (MV) candidates for merge mode.

Video encoder 20 and/or video decoder 30 may derive spatial MV candidates from the neighboring blocks shown in FIGS. 2A and 2B, for a specific PU ($PU_0$), although the methods generating the candidates from the blocks differ for merge and AMVP modes.

In merge mode, up to four spatial MV candidates may be derived with the orders showed on FIG. 2A with numbers, and the order is the following: left (0), above (1), above right (3), below left (4), and above left (5), as shown in FIG. 2A.

In AVMP mode, video encoder 20 and/or video decoder 30 may divide the neighboring blocks into two groups: left group consisting of the block 0 and 1, and above group consisting of the blocks 2, 3, and 4 as shown on FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 20 and/or video decoder 30 may scale the first available candidate to form the final candidate, thus the temporal distance differences may be compensated.

Video encoder 20 and/or video decoder 30 may add a temporal motion vector predictor (TMVP) candidate, if enabled and available, into the MV candidate list after spatial motion vector candidates. The process of motion vector derivation for TMVP candidate may be the same for both merge and AMVP modes, however the target reference index for the TMVP candidate in the merge mode may be always set to 0.

Figure 3A:
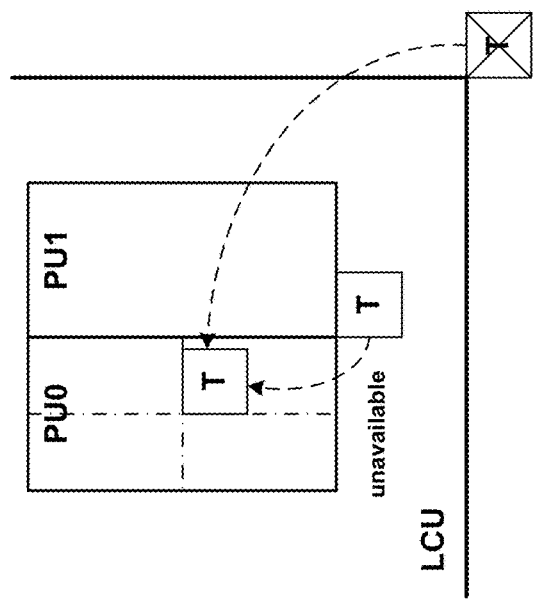
FIG. 3A is a conceptual diagram illustrating an example temporal motion vector predictor (TMVP) candidate.

The primary block location for TMVP candidate derivation is the bottom right block outside of the collocated PU as shown in FIG. 3A as a block "T", to compensate the bias to the above and left blocks used to generate spatial neighboring candidates. However, if that block is located outside of the current CTB row or motion information is not available, video encoder 20 and/or video decoder 30 may substitute the block with a center block of the PU.

Video encoder 20 and/or video decoder 30 may derive a motion vector for a TMVP candidate from the co-located PU of the co-located picture, indicated in the slice level.

Similar to temporal direct mode in AVC, video encoder 20 and/or video decoder 30 may scale a motion vector of the TMVP candidate motion vector, which may be performed to compensate the distance differences.

Motion vector scaling is discussed in the following. In some examples, the value of motion vectors is proportional to the distance of pictures in the presentation time. A motion vector associates two pictures, the reference picture, and the picture containing the motion vector (namely the containing picture). When a motion vector is utilized to predict the other motion vector, video encoder 20 and/or video decoder 30 may calculate the distance of the containing picture and the reference picture based on the Picture Order Count (POC) values.

For a motion vector to be predicted, both the motion vector's associated containing picture and reference picture may be different. Therefore, in some examples, video encoder 20 and/or video decoder 30 may calculate a new distance (based on POC). In this example, video encoder 20 and/or video decoder 30 may scale the motion vector based on these two POC distances. For a spatial neighboring candidate, the containing pictures for the two motion vectors are the same, while the reference pictures are different. In HEVC, motion vector scaling may apply to both TMVP and AMVP for spatial and temporal neighboring candidates.

Artificial motion vector candidate generation is discussed in the following. If a motion vector candidate list is not complete, video encoder 20 and/or video decoder 30 may generate artificial motion vector candidates. In this example, video encoder 20 and/or video decoder 30 may insert the artificial motion vector candidates at the end of the list until the video encoder 20 and/or video decoder 30 will have all candidates.

In merge mode, there are two types of artificial MV candidates: combined candidate derived only for B-slices and zero candidates used only for AMVP if the first type doesn't provide enough artificial candidates. For each pair of candidates that are already in the candidate list and have necessary motion information, video encoder 20 and/or video decoder 30 may derive bi-directional combined motion vector candidates by a combination of the motion vector of the first candidate referring to a picture in the list 0 and the motion vector of a second candidate referring to a picture in the list 1.

Pruning process for candidate insertion is discussed in the following. Candidates from different blocks may happen to be the same, which decreases the efficiency of a merge/AMVP candidate list. Video encoder 20 and/or video decoder 30 may apply a pruning process to solve this problem. In the pruning process, video encoder 20 and/or video decoder 30 may compare one candidate against the others in the current candidate list to avoid inserting identical candidate in certain extent. To reduce the complexity, video encoder 20 and/or video decoder 30 may apply only limited numbers of pruning processes instead of comparing each potential one with all the other existing ones.

Video encoder 20 and/or video decoder 30 may enable and disable weighted prediction at the slice level, and video encoder 20 may also signal weighted prediction parameters at the slice level. In contrast, video encoder 20 and/or video decoder 30 may enable and disable PBIC and the PU level, and video encoder 20 may signal IC parameters at the PU level to handle the local illumination variation.

Similar to when using WP, video encoder 20 and/or video decoder 30 may use a scaling factor (also denoted by a) and an offset (also denoted by b) in IC, and the shift number is fixed to be 6. Source device 12 may code an IC flag for each PU to indicate whether the IC applies for current PU or not. If the IC applies for the PU, source device 12 signals a set of IC parameters (i.e., a and b) to the decoder (e.g., destination device 14) and the decoder uses the set of IC parameters for motion compensation. In bi-prediction case, source device 12 may signal two scaling factors (one for each prediction direction) and one offset. To save bits spent on IC parameters, video encoder 20 and/or video decoder 30 may use a chroma component that shares the scaling factors with luma component and a fixed offset 128.

In 3D-HEVC, as described in G. Tech, K. Wegner, Y. Chen and S. Yea, "3D-HEVC Draft Text 7", Joint Collaborative Team on 3D Video Coding Extensions (JCT-3V) Doc., JCT3V-K1001, 11th Meeting: Geneva, Switzerland, 12-18 Feb. 2015, IC is enabled for inter-view prediction. Different from WP and PBIC which signals IC parameters explicitly, when using 3D-HEVC, video encoder 20 and/or video decoder 30 may derive IC parameters based on neighboring samples of current CU and neighboring samples of reference block.

In some examples, video encoder 20 and/or video decoder 30 may only apply IC on a 2N×2N partition mode. For AMVP mode, video encoder 20 may signal one IC flag for each CU that is predicted from inter-view reference picture. For merge mode, to save bits, video encoder 20 may signal an IC flag only when merge index of the PU is not equal to 0.

In some examples, IC is not performed for a CU that is only predicted from temporal reference pictures.

Linear IC model used in inter-view prediction is shown in Eq. (1):

$$p(i,j) = a*r(i+dv_x, j+dv_y) + b, \text{ where } (i,j) \in PU_c \quad (1)$$

Here, $PU_c$ is the current PU, (i, j) is the coordinate of pixels in $PU_c$, $(dv_x, dv_y)$ is the disparity vector of $PU_c$. p(i, j) is the prediction of $PU_c$, r is the PU's reference picture from neighboring view. a and b are parameters of the linear IC model.

Figure 5B:
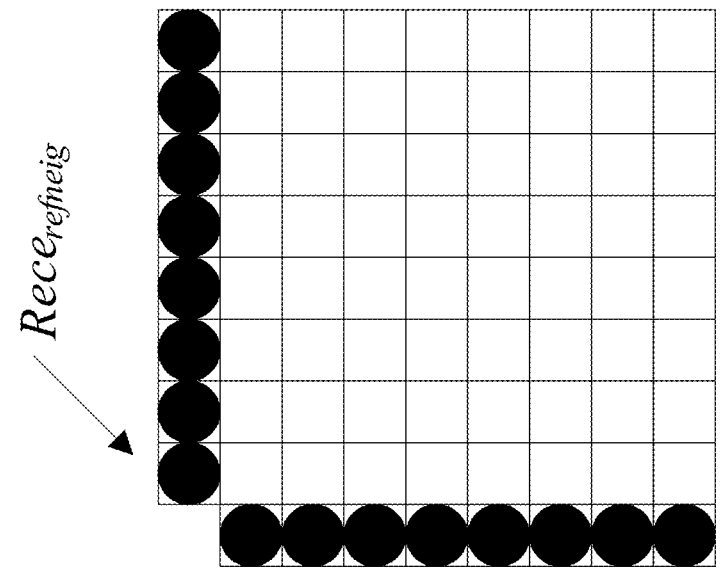
FIG. 5B is a conceptual diagram illustrating example neighboring pixels of a reference block used to estimate parameters in an illumination compensation (IC) model.
Figure 5A:
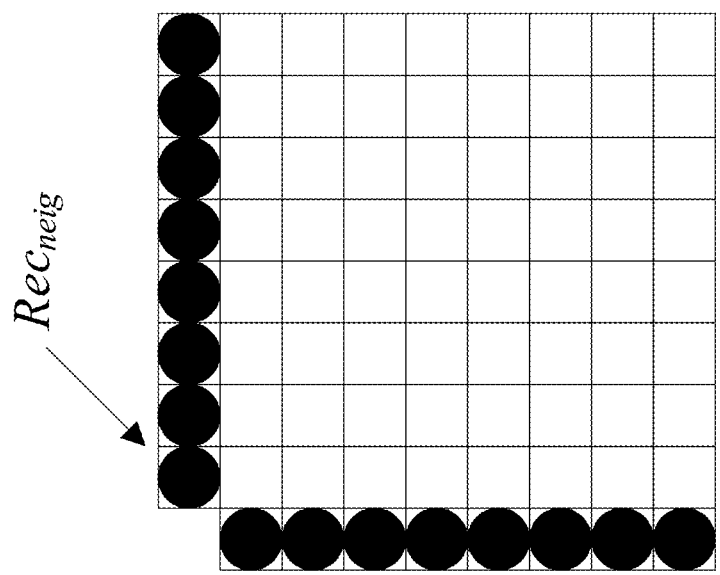
FIG. 5A is a conceptual diagram illustrating example neighboring pixels of a current coding unit (CU) used to estimate parameters in an illumination compensation (IC) model.

To estimate parameter a and b for a PU, video encoder 20 and/or video decoder 30 may use two set of pixels as shown in FIGS. 5A and 5B. In the example of FIG. 5A, the first set of pixels are available reconstructed neighboring pixels in left column and above row of current CU (the CU that contains current PU). FIG. 5B shows a second set of pixels that are corresponding neighboring pixels of current CU's reference block. The reference block of the current CU may be found by using current PU's disparity vector.

Let $Rec_{neig}$ and $Rec_{refneig}$ denote used neighbouring pixel set of current CU and its reference block respectively, and let 2N denote the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

where $Rec_{neig}$ denotes neighboring samples, where $Rec_{refneig}$ denotes reference neighboring samples, and where N denotes a pixel number in $Rec_{neig}$ and $Rec_{refneig}$.

In some examples, video encoder 20 and/or video decoder 30 may use only the linear model and b is always set equal to 0. In some examples, video encoder 20 and/or video decoder 30 may use only b and a is always set equal to 1.

In HEVC, Weighted Prediction (WP) is supported, where a scaling factor (denoted by a), a shift number (denoted by s) and an offset (denoted by b) is used in the motion compensation. Suppose the pixel value in position (x, y) of the reference picture be p(x, y), then p'(x, y)=((a*p(x, y)+(1<<(s−1)))>>s)+b instead of p(x, y) is used as the prediction value in motion compensation.

When WP is enabled, for each reference picture of current slice, source device 12 may signal a flag to indicate whether WP applies for the reference picture or not. If WP applies for one reference picture, source device 12 may send a set of WP parameters (i.e., a, s and b) to the decoder and the set of WP parameters are used for motion compensation from the reference picture. To flexibly turn on/off WP for the luma and chroma components, source device 12 may separately signal the WP flag and WP parameters for luma and chroma components. In WP, video encoder 20 and/or video decoder 30 may use one same set of WP parameters for all pixels in one reference picture.

Figure 6B:
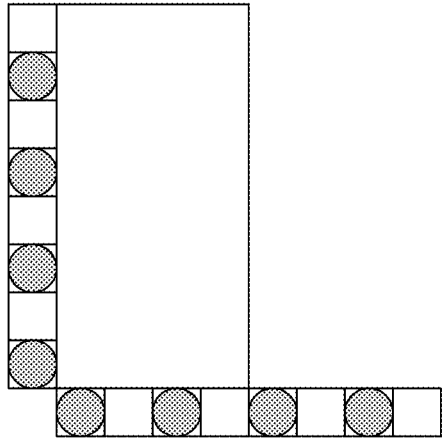
FIG. 6B is a conceptual diagram illustrating example neighboring samples of a reference block used for deriving IC parameters.
Figure 6A:
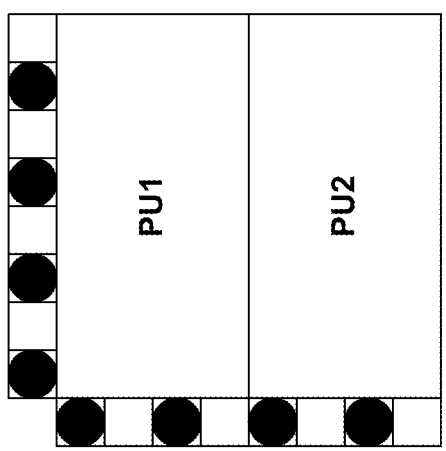
FIG. 6A is a conceptual diagram illustrating example neighboring samples of a current CU used for deriving IC parameters.

LIC is based on a linear model for illumination changes, using a scaling factor a and an offset b. Video encoder 20 and/or video decoder 30 may may enable or disable LIC adaptively for each inter-mode coded CU. When LIC applies for a CU, video encoder 20 and/or video decoder 30 may employ a least square error method to derive the parameters a and b by using the neighbouring samples of the current CU and their corresponding reference samples. More specifically, in the example of FIG. 6A, video encoder 20 and/or video decoder 30 may use the subsampled (2:1 sub sampling) neighbouring samples of the CU. Additionally, or alternatively, in the example of FIG. 6B, video encoder 20 and/or video decoder 30 may use corresponding pixels (identified by motion information of the current CU or sub-CU) in the reference picture. For example, video encoder 20 and/or video decoder 30 may derive and apply the IC parameters for each prediction direction separately.

When a CU is coded with merge mode, video encoder 20 and/or video decoder 30 may copy the LIC flag from neighbouring blocks, in a way similar to motion information copy in merge mode; otherwise, video encoder 20 and/or video decoder 30 may signal an LIC flag for the CU to indicate whether LIC applies or not.

Figure 7:
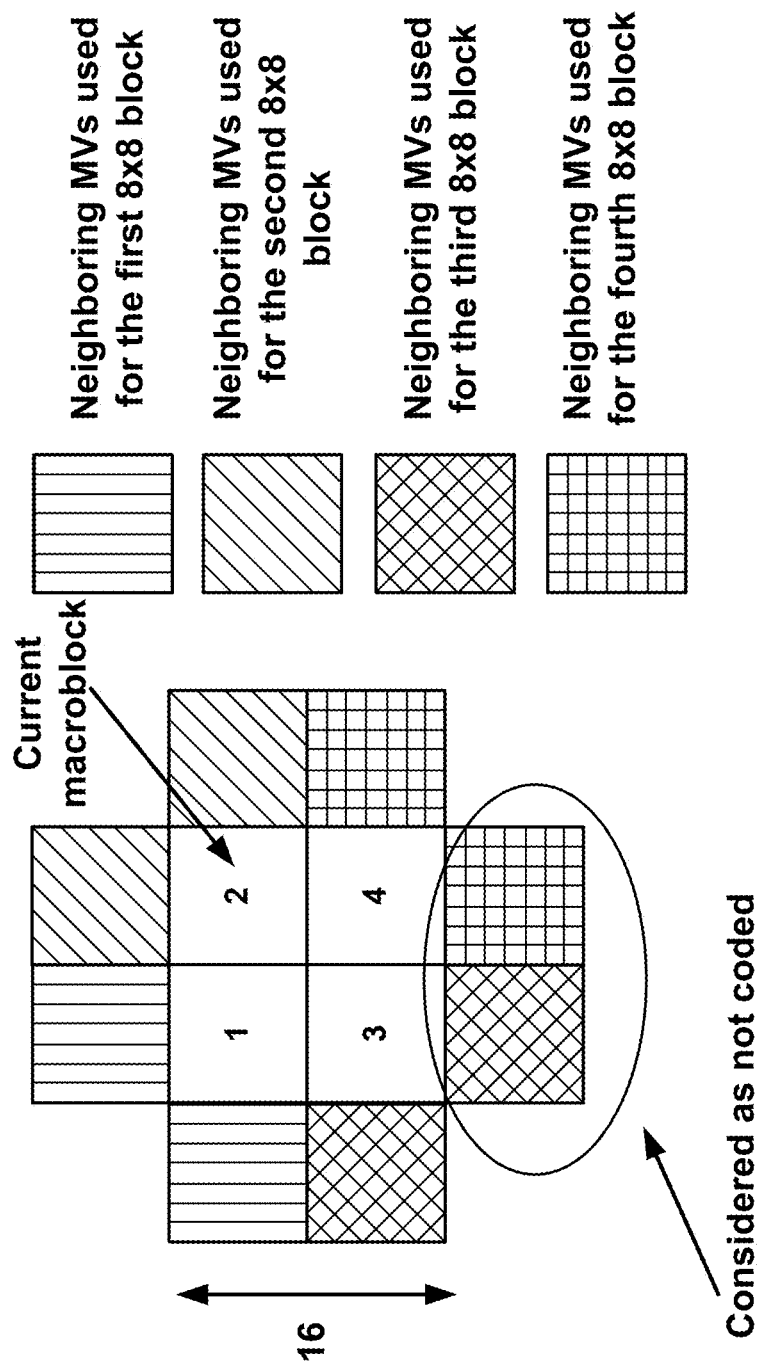
FIG. 7 is a conceptual diagram illustrating example overlapped block motion compensation (OBMC) in H.263.

OBMC was proposed in the development of H.263, as discussed in Video Coding for Low Bitrate Communication, document Rec. H.263, ITU-T, April 1995. video encoder 20 and/or video decoder 30 may perform OBMC on 8×8 block, and motion vectors of two connected neighboring 8×8 blocks may be used for current block as shown in FIG. 7. For example, for the first 8×8 block in current macroblock, besides its own motion vector, video encoder 20 and/or video decoder 30 may apply the above and left neighboring motion vector to generate two additional prediction blocks. In this way, video encoder 20 and/or video decoder 30 may use each pixel in the current 8×8 block have three prediction values and weighted average of these three prediction values as the final prediction.

When a neighboring block is not coded or coded as intra, i.e., the neighboring block does not have available motion vector, video encoder 20 and/or video decoder 30 may use a motion vector of a current 8×8 block as the neighboring motion vector. Meanwhile, for the third and fourth 8×8 block of current macroblock (as shown in FIG. 7), video encoder 20 and/or video decoder 30 may not use the below neighboring block. In other words, for example, for each MB, video encoder 20 and/or video decoder 30 may use no motion information from MBs below a current MB to reconstruct the pixels of the current MB during the OBMC.

Figures 8A, 8B:
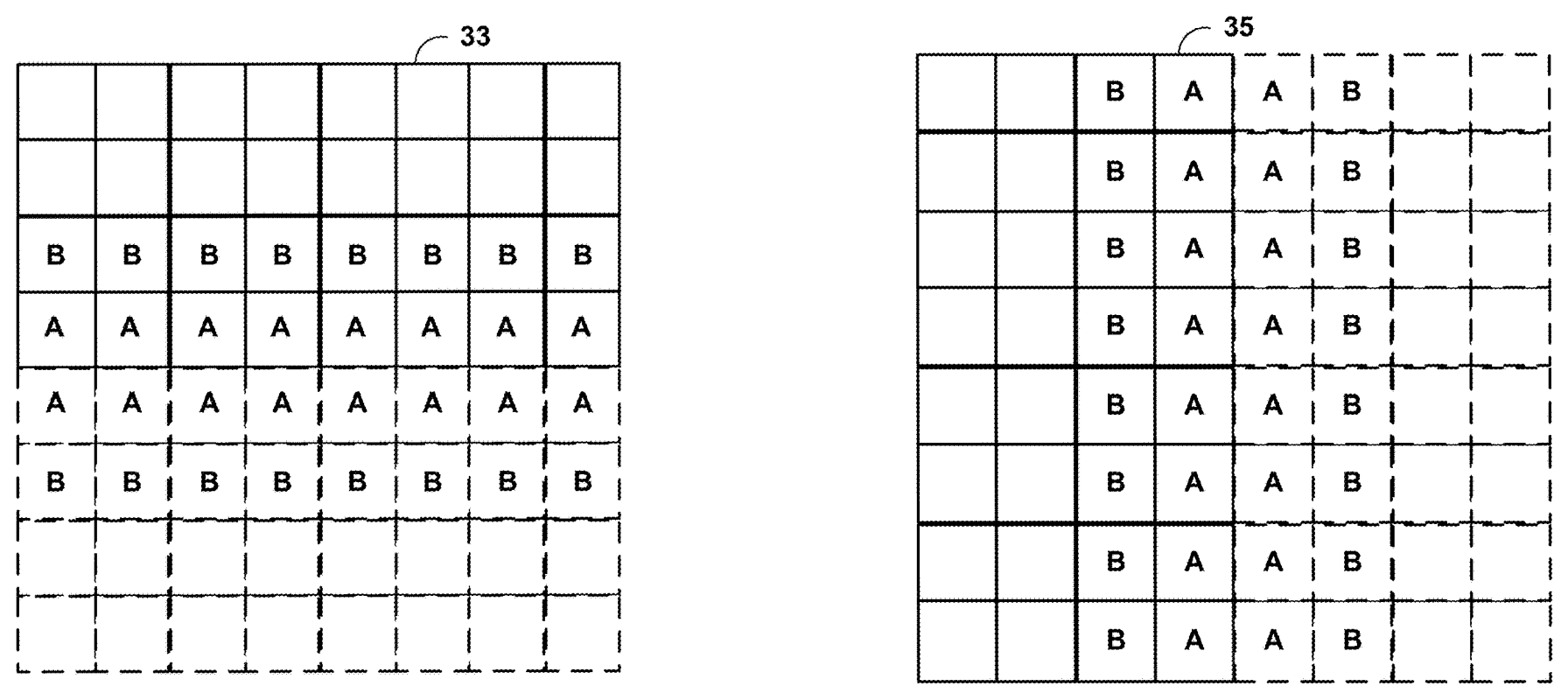

FIGS. 8A and 8B are conceptual diagrams illustrating aspects of OBMC according to HEVC. In the development of HEVC, OBMC was proposed to smooth the PU boundary. FIG. 8A shows section 33 and FIG. 8B shows section 35. Sections 33 and 35 each illustrate a CU that includes two PUs. In both section 33 and section 35, the pixels with solid-line boundaries belong to PU0, while the pixels with dashed-line boundaries belong to PU1. If a CU contains two or more PUs, then video encoder 20 and video decoder 30 may use OBMC to smooth lines and/or columns near the PU boundary. For pixels marked with "A" or "B" in PU0 or PU1 of FIGS. 8A and 8B, video encoder 20 and video decoder 30 may generate two prediction values. For instance, video encoder 20 and video decoder 30 may generate the prediction values for the pixels marked "A" or "B" by applying motion vectors of PU0 and PU1 respectively, and using the weighted average of the prediction values as the final prediction for the respective pixel.

Figure 9B:
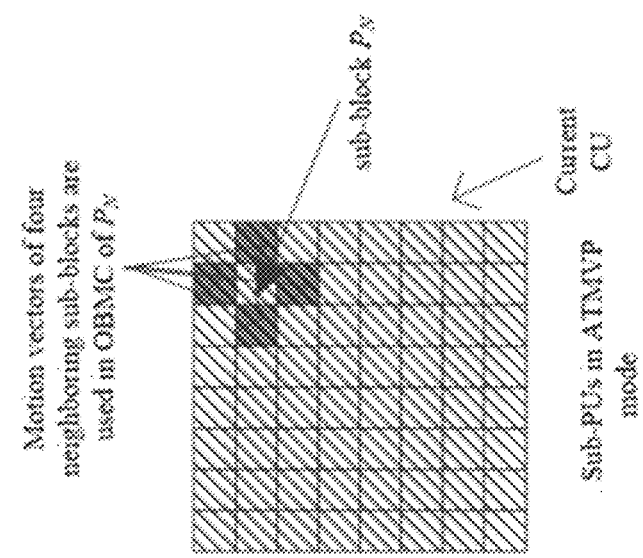
FIG. 9B is a conceptual diagram illustrating sub-PUs in ATMVP mode.
Figure 9A:
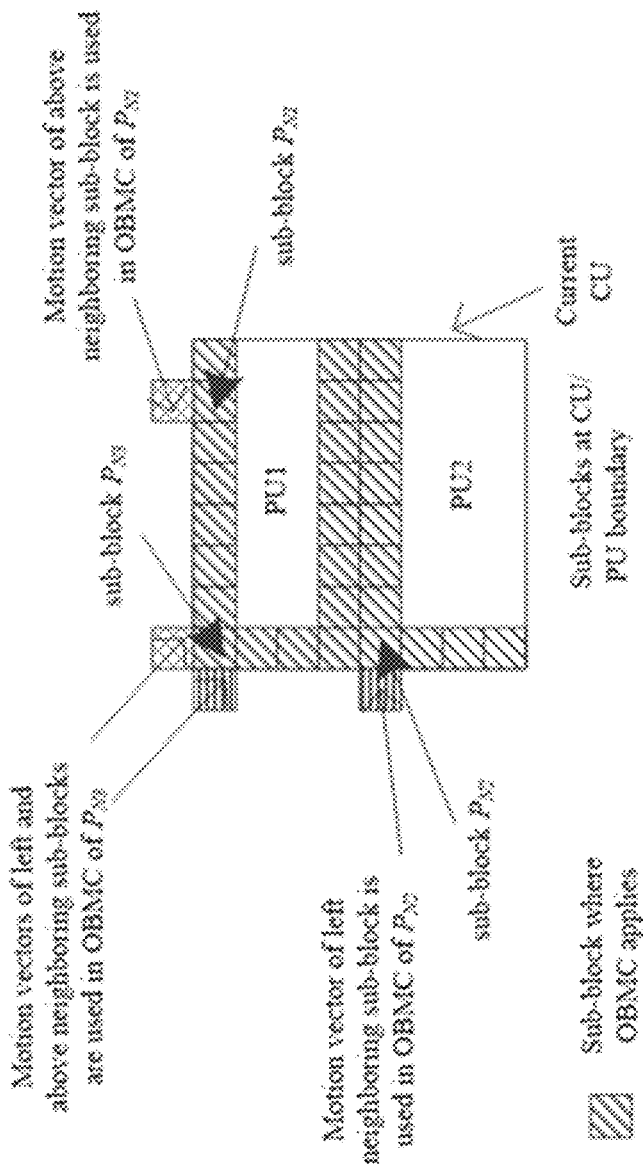
FIG. 9A is a conceptual diagram illustrating example sub-blocks where OBMC applies.

FIG. 9A is a conceptual diagram illustrating sub-blocks where OBMC applies, in accordance with sub-PU level OBMC techniques. FIG. 9B is a conceptual diagram illustrating sub-PUs in ATMVP mode. Sub-PU level OBMC is applied in the current JEM configuration. According to the sub-PU level OBMC of JEM, OBMC is performed for all Motion Compensated (MC) block boundaries except the right and bottom boundaries of a CU. Moreover, according to the sub-PU level OBMC of JEM, video encoder 20 and video decoder 30 may apply OBMC for both luma and chroma components. In HEVC, an MC block corresponds to a PU. In JEM, when a PU is coded with a sub-PU mode, each sub-block of the PU is an MC block. To process CU/PU boundaries in a uniform fashion, video encoder 20 and video decoder 30 may perform OBMC at a sub-block level for all MC block boundaries, with the sub-block size set equal to 4×4, as illustrated in FIG. 9A.

When OBMC applies to the current sub-block, in addition to the current motion vectors, video encoder 20 and video decoder 30 may also use the motion vectors of four connected neighbouring sub-blocks, if available and not identical to the current motion vector, to derive a prediction block for the current sub-block. Video encoder 20 and video decoder 30 may weight the multiple prediction blocks based on multiple motion vectors, to generate the final prediction signal of the current sub-block.

The discussion below denotes a prediction block based on motion vectors of a neighboring sub-block as $P_N$, with N indicating an index for the neighboring above, below, left and right sub-blocks, and denotes the prediction block based on motion vectors of the current sub-block as $P_C$. If $P_N$ belongs to the same PU as $P_C$ (and thus contains the same motion information), video encoder 20 and video decoder 30 do not perform the OBMC from $P_N$. Otherwise, video encoder 20 and video decoder 30 may add every pixel of $P_N$ to the same pixel in $P_C$. That is, if $P_N$ does not belong to the same PU as $P_C$, four rows/columns of $P_N$ are added to $P_C$.

Video encoder 20 and video decoder 30 may use the weighting factors {¼, ⅛, 1/16, 1/32} for $P_N$ and may use the weighting factors {¾, ⅞, 15/16, 31/32} for $P_C$. The exceptions are small MC blocks, (e.g., when PU size is equal to 8×4, 4×8 or a PU is coded with Advanced Temporal Motion Vector Prediction (ATMVP) mode), for which video encoder 20 and video decoder 30 may add only two rows/columns of $P_N$ to $P_C$. In these cases, video encoder 20 and video decoder 30 may use weighting factors {¼, ⅛} for $P_N$ and may use weighting factors {¾, ⅞} for $P_C$. For a $P_N$ generated based on motion vectors of vertically neighboring sub-block(s), video encoder 20 and video decoder 30 may add pixels in the same row of $P_N$ to $P_C$ with a same weighting factor. For a $P_N$ generated based on motion vectors of horizontally neighboring sub-block(s), video encoder 20 and video decoder 30 may add pixels in the same column of $P_N$ to $P_C$ with a same weighting factor.

For PU boundaries, video encoder 20 and video decoder 30 may apply OBMC on each side of the boundary. As shown in FIG. 9A, OBMC can be applied along the boundary between PU1 and PU2 twice. First, OBMC is applied with PU2's MV to the dashed-line-bordered blocks along the boundary inside PU1. Second, OBMC is applied with the PU1's MV to the dashed-line-bordered blocks along the boundary inside PU2. In contrast, OBMC is applied to one side of CU boundaries, because when coding the current CU, the already-coded CUs cannot be changed.

Figure 10:
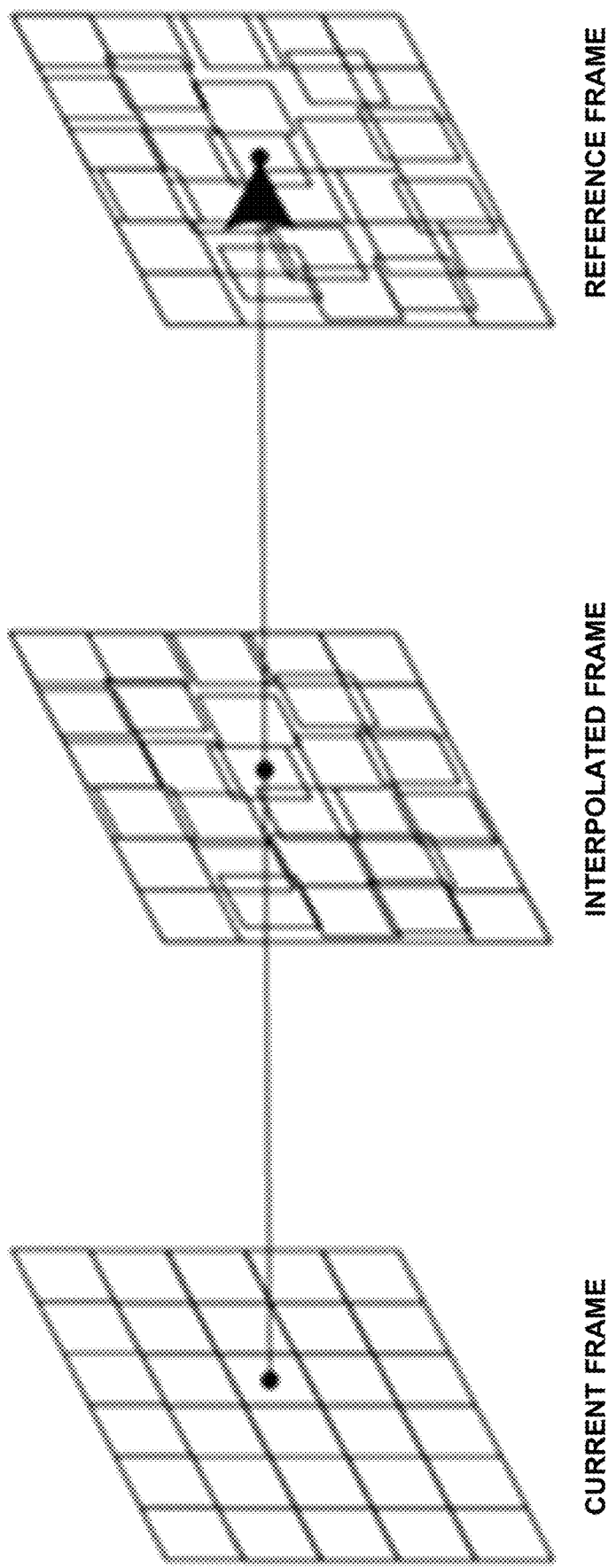
FIG. 10 is a conceptual diagram illustrating example unilateral motion estimation (ME) in frame rate up-conversion (FRUC).

FIGS. 9A, 9B, and 10 are conceptual diagrams illustrating examples of motion estimation for frame rate up-conversion technologies. Frame rate up-conversion (FRUC) technology is used to generate high-frame-rate videos based on low-frame-rate videos. FRUC algorithms may be divided into two types. One type of processes that interpolate intermediate frames by simple frame repetition or averaging. However, these techniques may provide improper results in a picture that contains a lot of motion. The other type of processes, called motion-compensated FRUC (MC-FRUC), consider object movement when generating intermediate frames and includes two steps: motion estimation (ME) and motion-compensated interpolation (MCI). ME generates motion vectors (MVs), which represent object motion using vectors, whereas MCI uses MVs to generate intermediate frames.

The block-matching algorithm (BMA) is widely used for ME in MC-FRUC as BMA is simple to implement. In BMA, video encoder 20 and/or video decoder 30 may divide an image into blocks and detects the movement of those blocks. Two kinds of ME are primarily used for BMA: unilateral ME and bilateral ME.

In the example of FIG. 10, when performing unilateral ME, video encoder 20 and/or video decoder 30 may obtain MVs by searching the best matching block from a reference frame of the current frame. Video encoder 20 and/or video decoder 30 may locate the block on the motion trajectory in the interpolated frame so that the MV is achieved. As shown in FIG. 10, three blocks in three frames are involved following the motion trajectory. Although the block in the current frame belongs to a coded block, the best matching block in the reference frame may not fully belong to a coded block, neither does the block in interpolated frame. Consequently, overlapped regions of the blocks and un-filled (holes) regions may occur in the interpolated frame.

To handle overlaps, some FRUC algorithms may involve averaging and overwriting the overlapped pixels. Moreover, holes may be covered by the pixel values from a reference or a current frame. However, these algorithms may result in blocking artifacts and blurring. Hence, motion field segmentation, successive extrapolation using the discrete Hartley transform, and image inpainting are proposed to handle holes and overlaps without increasing blocking artifacts and blurring.

Figure 11:
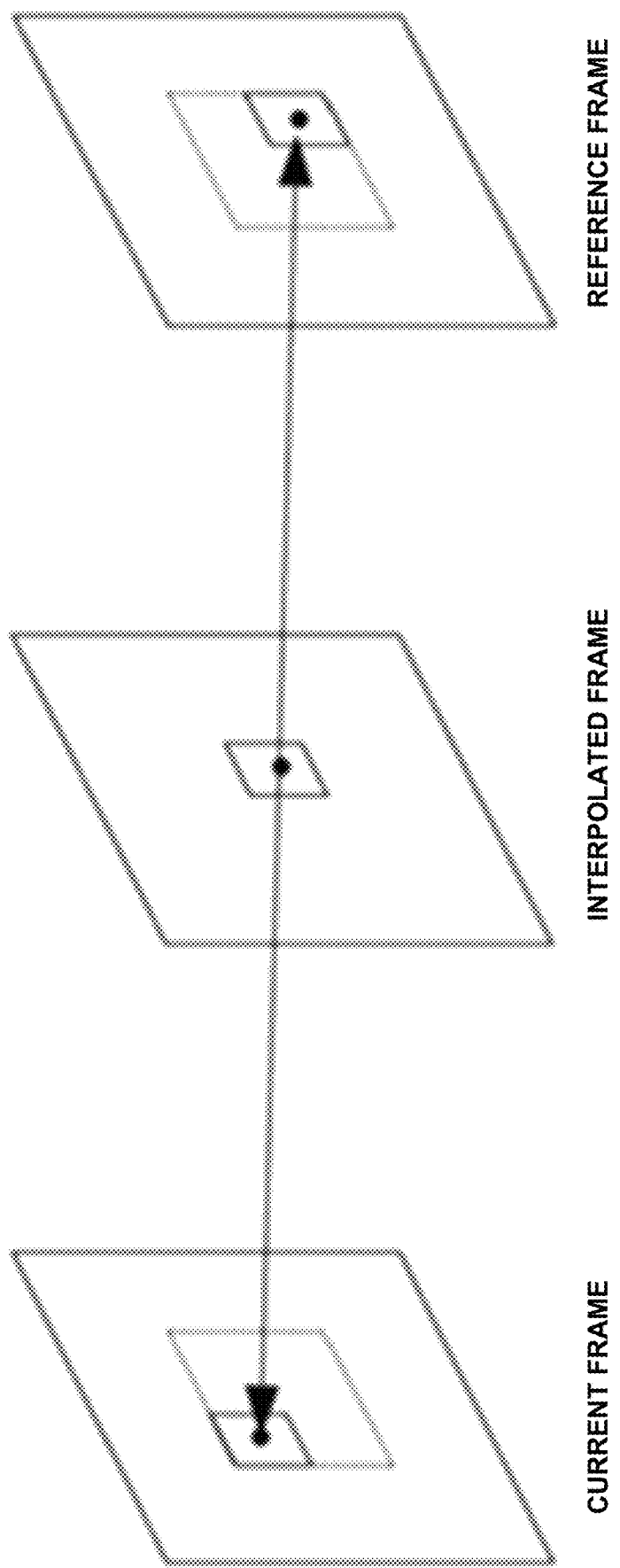
FIG. 11 is a conceptual diagram illustrating example bilateral ME in FRUC.

FIG. 11 illustrates bilateral ME for FRUC. As shown in FIG. 11, bilateral ME is another solution (in MC-FRUC) that may be used to avoid the problems caused by overlaps and holes. In bilateral ME, video encoder 20 and/or video decoder 30 may obtain MVs passing through a block in the intermediate frame using the temporal symmetry between blocks of the reference and current frames. As a result, obtaining MVs do not generate overlaps and holes. Since it is assumed the current block is a block that is being processed, in a certain order, e.g., as in the case of video coding, a sequence of such blocks would cover the whole intermediate picture without overlap. For example, in the case of video coding, video encoder 20 and/or video decoder 30 may process blocks in the decoding order. Therefore, such techniques may be more suitable if FRUC ideas may be considered in a video coding framework.

Figure 12:
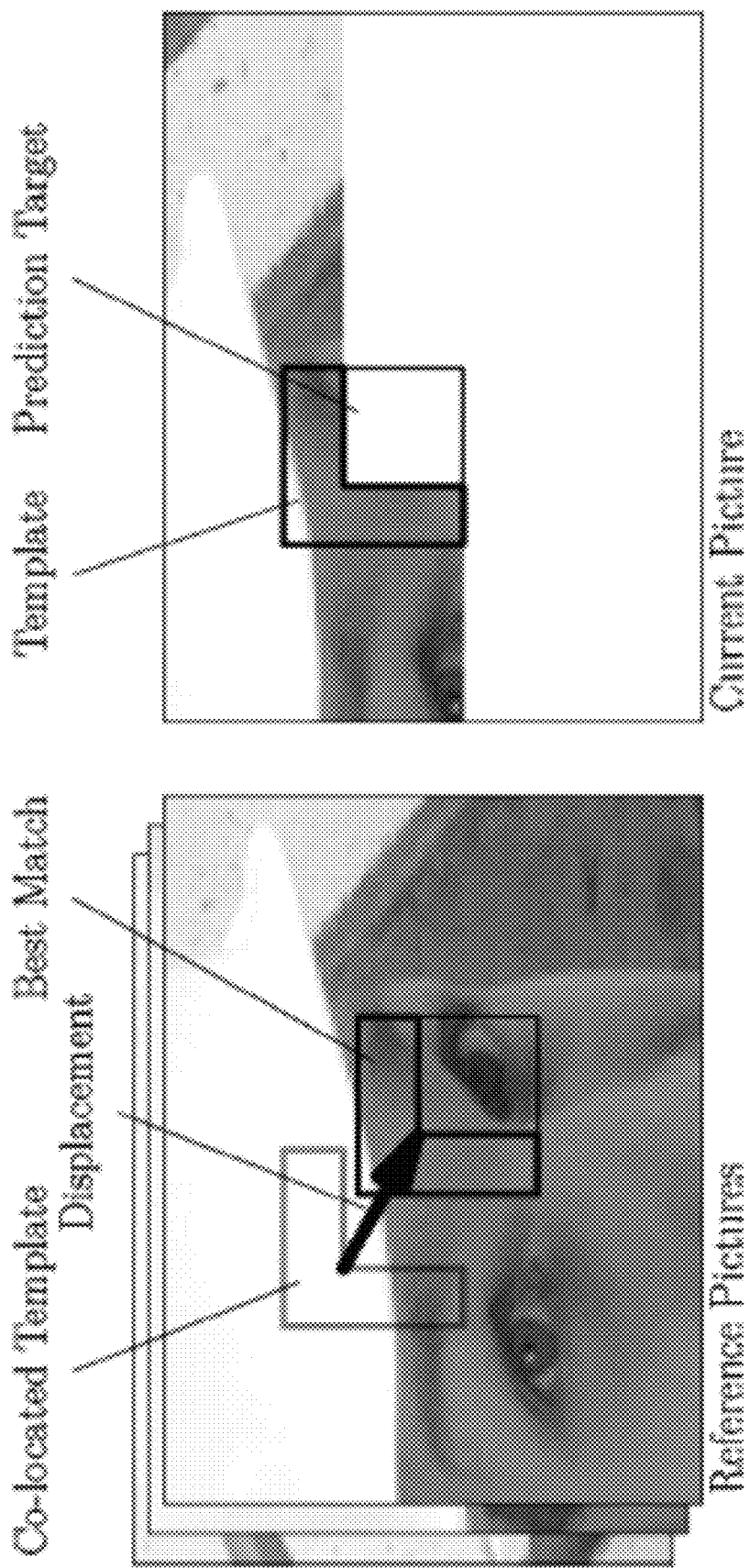
FIG. 12 is a conceptual diagram illustrating example template matching based Decoder side Motion Vector Derivation (DMVD).

FIG. 12 is a diagram illustrating aspects of decoder side motion vector derivation. One type of decoder side motion derivation (DMVD) is template matching-based DMVD, which is illustrated in FIG. 12. With the continual advancement of video codecs, the percentage of bits dedicated to motion information in bitstreams continues to increase. DMVD was proposed in an effort to reduce the bit cost of motion information. Template matching based DMVD yielded a significant coding efficiency improvement. According to the template matching techniques illustrated in FIG. 12, instead of searching best match for the prediction target, which is the current block being processed by video decoder 30, video decoder 30 may search for the best match of template in the reference frame. Assuming the template and the prediction target are from the same object, video decoder 30 may use the motion vector of the template as the motion vector of the prediction target.

Because the template matching is conducted at both video encoder 20 and video decoder 30, the motion vector can be derived at the decoder side, to avoid signaling cost. In other words, by implementing DVMD, video decoder 30 may reduce the bit count of the bitstream that video encoder 20 signals, because video encoder 20 may eliminate a number of bits that would otherwise be used to signal motion information. In this way, DMVD may reduce bandwidth consumption in video coding technology.

Figure 13:
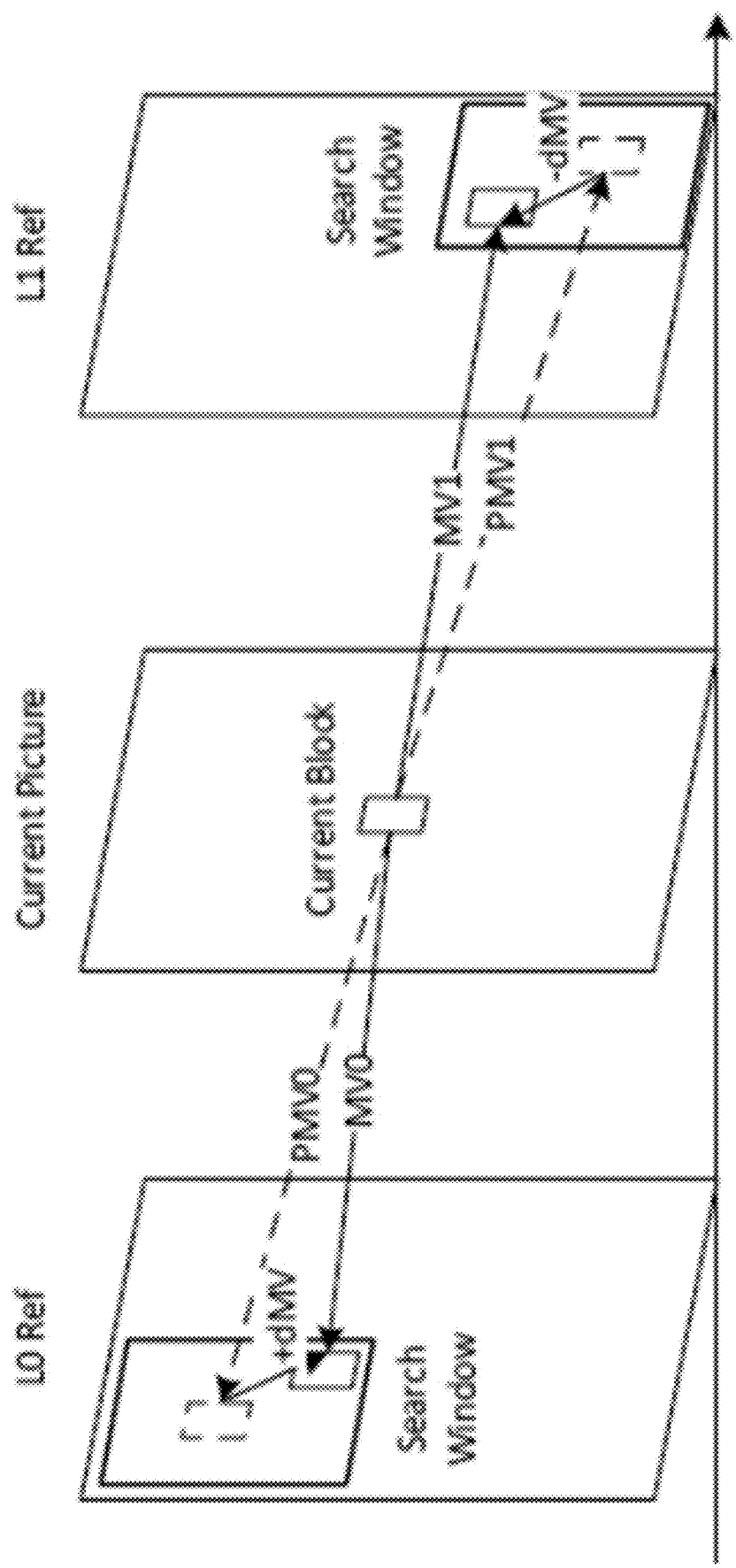
FIG. 13 is a conceptual diagram illustrating example mirror based bi-directional MV derivation in DMVD.

FIG. 13 is a conceptual diagram illustrating aspects of mirror-based bi-directional motion vector derivation in decoder side motion vector derivation. Mirror-based bi-directional MV derivation is another category of DMVD, in addition to the DMVD categories discussed above. Aspects of mirror-based bi-directional MV derivation are similar to bilateral ME in FRUC. Mirror-based MV derivation is applied using centro-symmetric motion estimation around search centers with fractional sample accuracy.

According to mirror-based bi-directional MV derivation for DMVD, video encoder 20 may predefine and signal the size and/or location of a search window in the encoded video bitstream. In FIG. 13, "dMV" represents an offset which video encoder 20 may add to PMV0 and subtract from PMV1 to generate a MV pair consisting of MV0 and MV1. Video encoder 20 may check all of the values of dMV inside the search window, and may use the Sum of Absolute Difference (SAD) between the L0 and L1 reference blocks as the measurement of centro-symmetric motion estimation.

Video encoder 20 may select the MV pair with the minimum SAD as the output of the centro-symmetric motion estimation. Because mirror-based bi-directional MV derivation may need a future reference (e.g., a reference at a temporal position later than the current frame in decoding order) and an earlier reference (e.g., a reference at a temporal position earlier than the current frame in decoding order) for the SAD matching, SAD may not be applied to P frame or low-delay B frames in which only the former reference is available.

Figure 14:
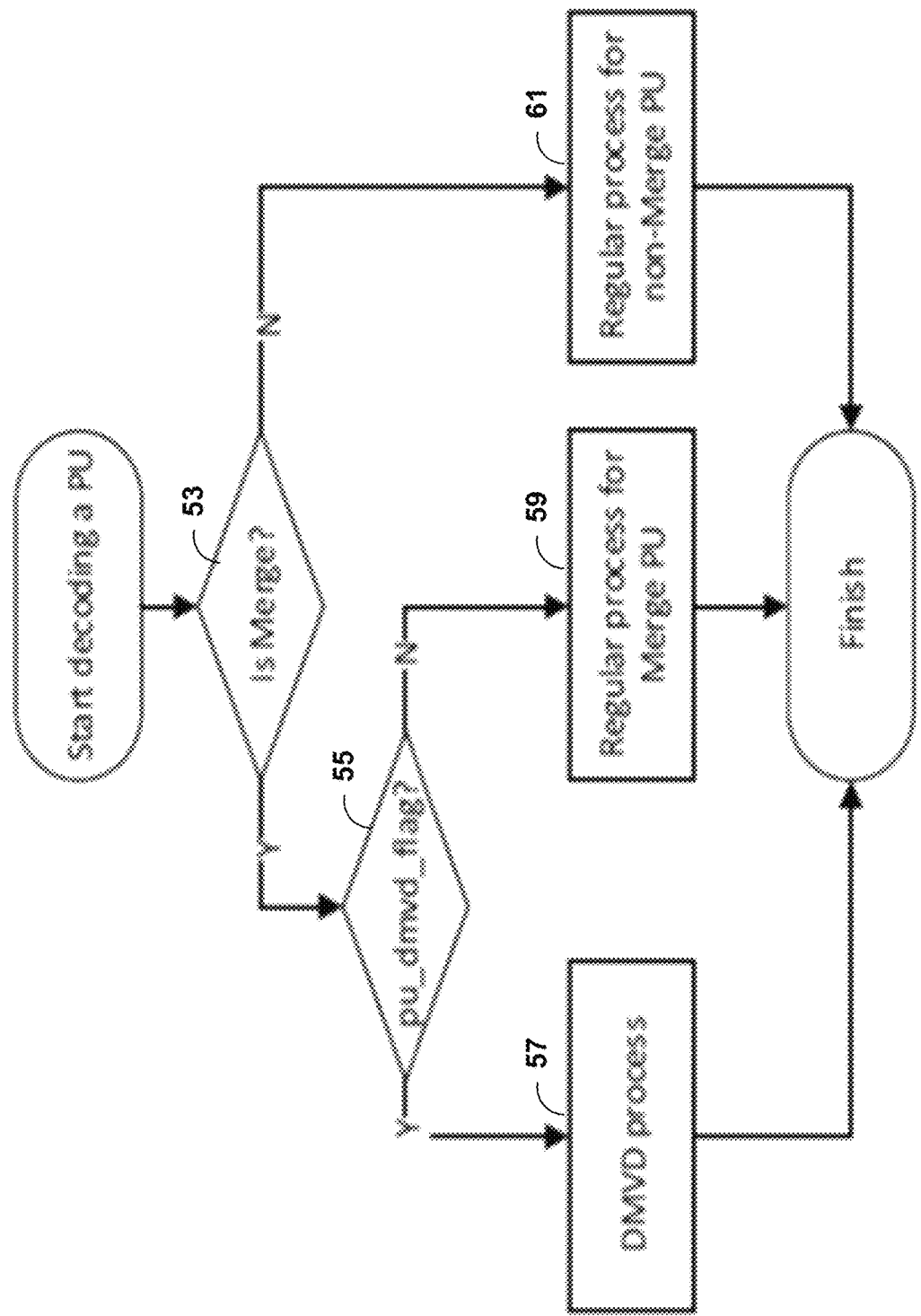
FIG. 14 is a flowchart illustrating example PU decoding with pu_dmvd_flag added.

FIG. 14 illustrates an example related to mirror-based bi-directional MV derivation to combine the mirror-based bi-directional MV derivation with merge mode in HEVC. In the example combination of mirror-based bi-directional MV derivation and merge mode coding, video encoder 20 and/or video decoder 30 may be configured to determine whether merge mode is enabled for the current PU (53). In response to determining that the merge mode is not enabled ("N" of step 53), video encoder 20 and/or video decoder 30 may be configured to perform a regular process for non-merge PU (61).

In response, however, to determining that the merge mode is enabled ("Y" of step 53), video encoder 20 may determine whether to encode and signal a flag called "pu_dmvd_flag" for a PU of B slices to indicate whether DMVD mode is applied to the current PU (55). In response to encoding the "pu_dmvd_flag" ("Y" of step 55), video encoder 20 and/or video decoder 30 may be configured to perform a DMVD process (57). In response, however, to not encoding the "pu_dmvd_flag" ("N" of step 55), video encoder 20 and/or video decoder 30 may be configured to perform a regular process for merge PU (59). Because DMVD mode does not explicitly cause video encoder 20 to transmit any MV information in the bitstream, the decoding process may integrate the pu_dmvd_flag with the syntax of merge mode in the HEVC decoding process.

As shown in FIGS. 5A, 5B, and 6A, 6B, when applying LIC techniques a video coder may access neighboring reconstructed samples adjacent to a current block. In practical hardware architecture, these samples may not yet have been reconstructed (e.g., when the current block is conducting motion compensation). In this case, the motion compensation procedure of the current block may be blocked, until the video coder reconstructs the neighboring samples, resulting undesirable delay in the timeline.

The following itemized methods may be applied individually. Alternatively, any combination of them may be applied. Please note that reference index information is regarded as a part of motion information in this disclosure, sometimes they are jointly called as a set of motion information.

Figure 15A:
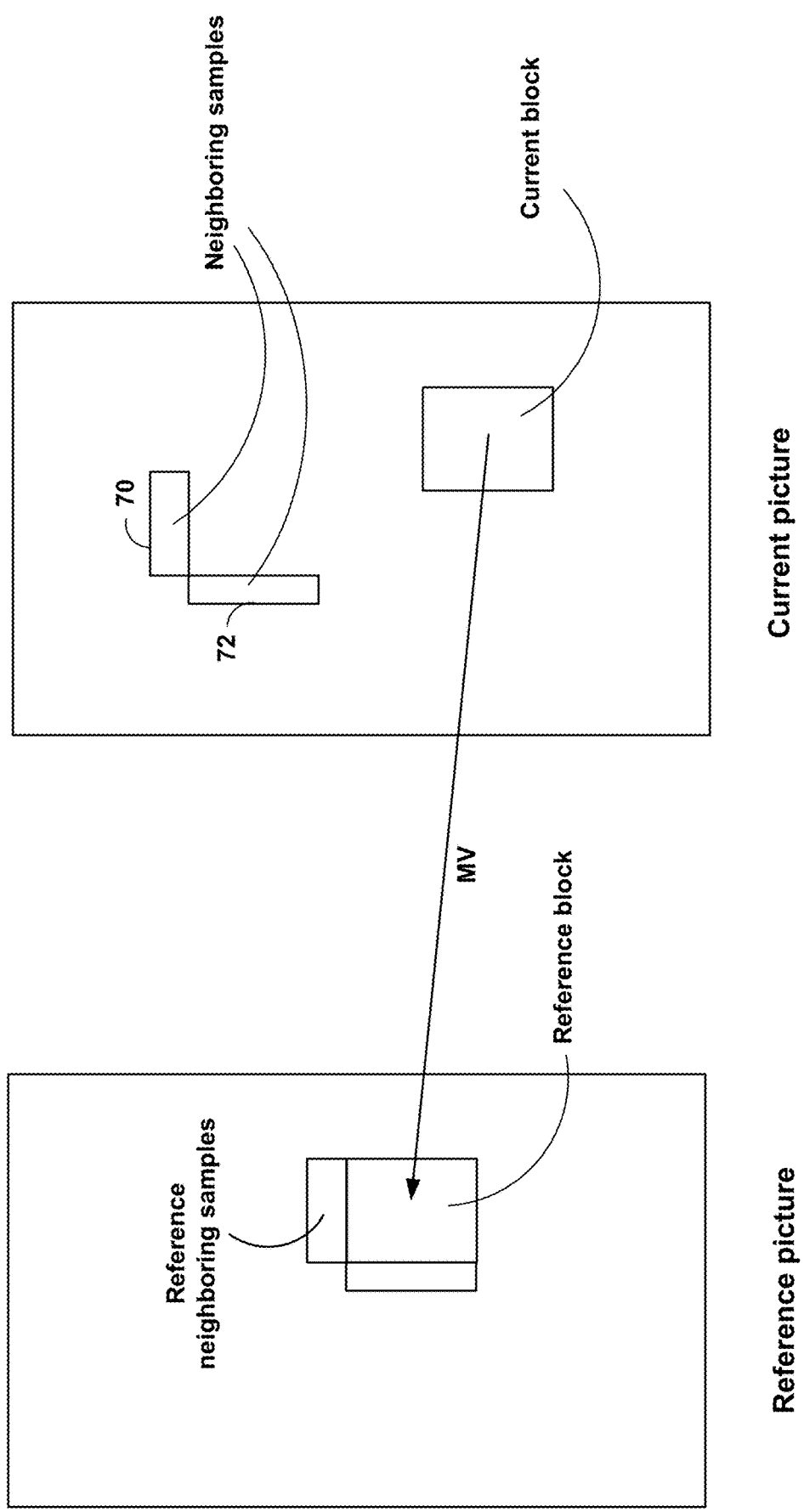
FIG. 15A is a conceptual diagram illustrating an example of non-adjacent neighboring samples for local illumination compensation (LIC) that are connected.
Figure 15B:
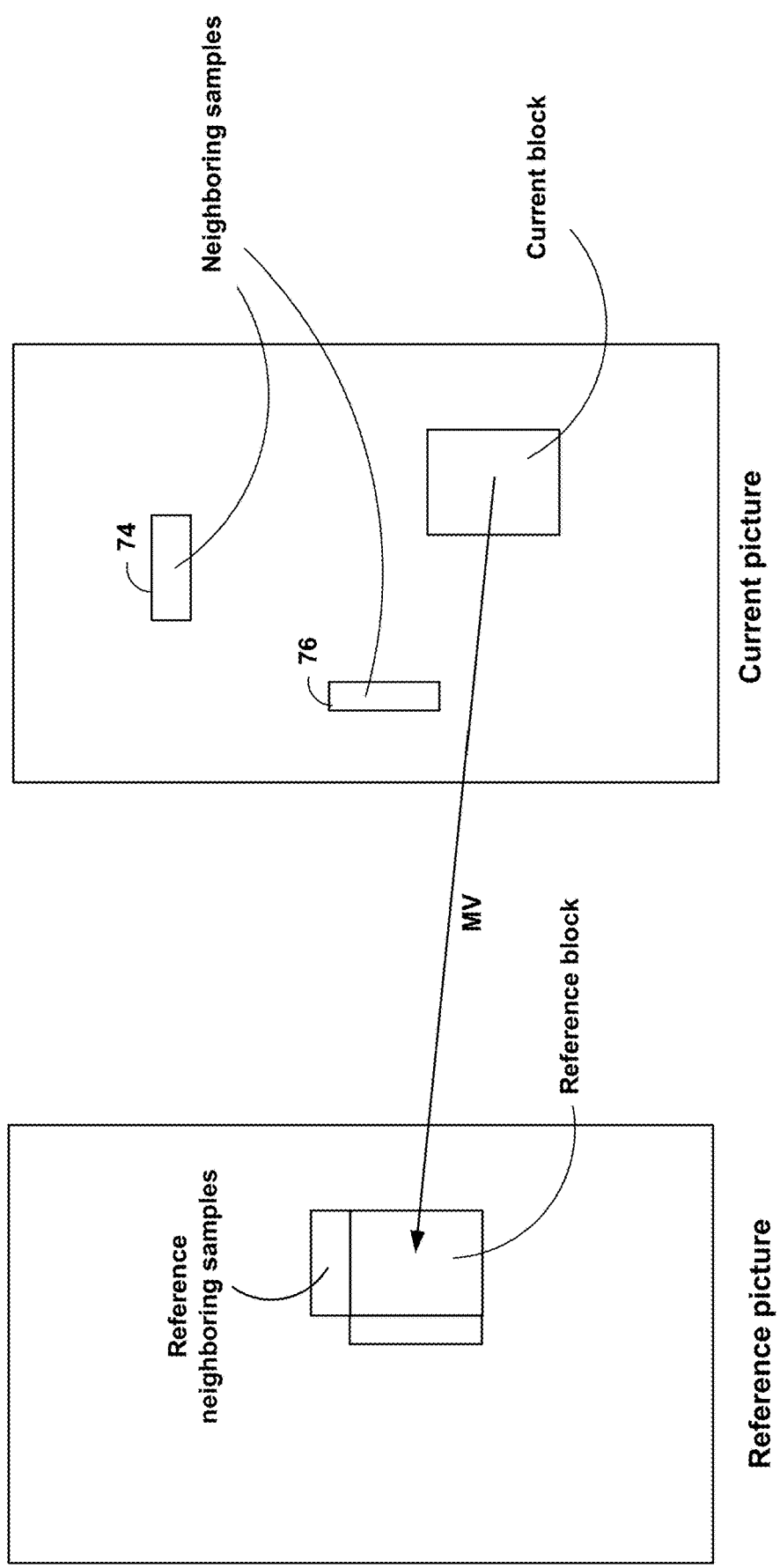
FIG. 15B is a conceptual diagram illustrating an example of non-adjacent neighboring samples for LIC that are disconnected.

In the examples of FIGS. 15A and 15B, video decoder 30 and/or video encoder 20 may be configured to use neighboring samples to derive the LIC parameter information (e.g., the weight and/or offset in equation (2) and (3)) may be not adjacent to the current block. That is, for example, to derive local illumination compensation information, video decoder 30 and/or video encoder 20 may be configured to calculate a weight and/or offset using the neighboring samples. Specifically, in the example of FIG. 15A, video decoder 30 and/or video encoder 20 may be configured to use the above neighboring samples 70 and the left neighboring samples 72 that are connected. For instance, neighboring samples 70 may represent a first set of samples arranged in a row and neighboring samples 72 may represent a second set of samples arranged in a column, where the second set of samples are adjacent to the first set of samples.

In the example of FIG. 15B, video decoder 30 and/or video encoder 20 may be configured to use the above neighboring samples 74 and the left neighboring samples 76 that are disconnected. For instance, neighboring samples 74 may represent a first set of samples arranged in a row and neighboring samples 76 may represent a second set of samples arranged in a column, where the second set of samples are spaced apart from the first set of samples.

Video decoder 30 and/or video encoder 20 may be configured to determine that the neighboring samples have been reconstructed before conducting the LIC process for the current block. For example, video decoder 30 and/or video encoder 20 may be configured to reconstruct before, deriving local illumination compensation information for the current block, neighboring samples. For instance, video decoder 30 and/or video encoder 20 may be configured to reconstruct before, deriving local illumination compensation information for the current block, neighboring samples 70 and neighboring samples 72 of FIG. 15A. In another instance, video decoder 30 and/or video encoder 20 may be configured to reconstruct before, deriving local illumination compensation information for the current block, neighboring samples 74 and neighboring samples 76 of FIG. 15B.

Figure 16:
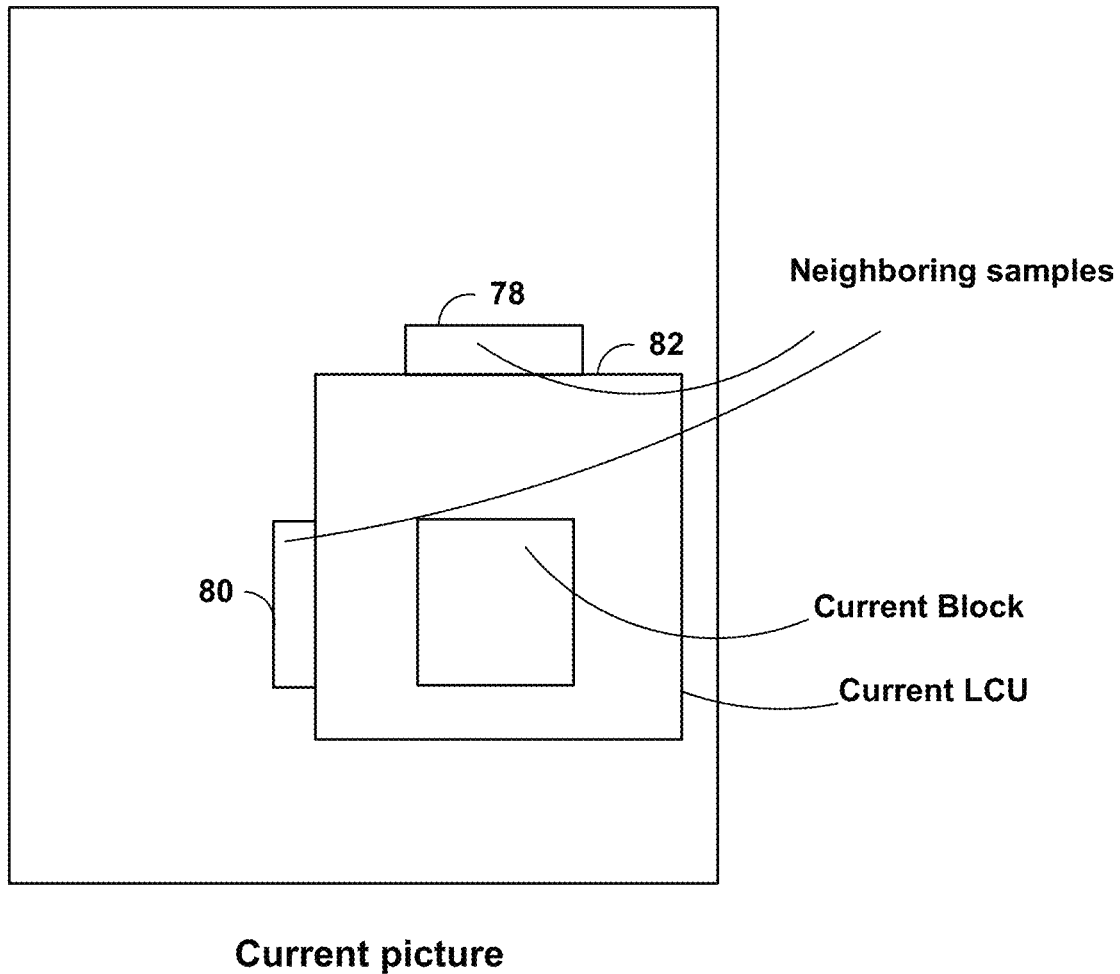
FIG. 16 is a conceptual diagram illustrating example neighboring samples outside but adjacent to the current largest coding unit (LCU).

Video decoder 30 and/or video encoder 20 may be configured to use neighboring samples which are out of a region covering the current block. In some examples, video decoder 30 and/or video encoder 20 may be configured to specify the region as comprising a LCU or a CTU covering the current block. In the example of FIG. 16, video decoder 30 and/or video encoder 20 may be configured to use neighboring samples which are out of a region defined to be a LCU (also known as a CTU) covering the current block. For example, video decoder 30 and/or video encoder 20 may be configured to use neighboring samples which are out of the region and are adjacent to the region. In this example, video decoder 30 and/or video encoder 20 may be configured to use above neighboring samples 78 and left neighboring samples 80 that are both located at the aligned position outside but adjacent to the current LCU 82. Video decoder 30 and/or video encoder 20 may be configured to define the region to be covering the current block, the region's above coded block (e.g., CU) and/or the region's left coded block.

To derive local illumination compensation information, video decoder 30 and/or video encoder 20 may be configured to calculate a weight and/or offset using the reference neighboring samples. Video decoder 30 and/or video encoder 20 may be configured to determine the reference neighboring samples used in equations (2) and (3) to derive the LIC parameters (e.g., the weight and offset) that are adjacent to the reference block, as shown in the examples of FIGS. 15A and 15B. Said differently for example, video decoder 30 and/or video encoder 20 may be configured to determine the reference neighboring samples that are adjacent to a reference block for the current block. In some examples, video decoder 30 and/or video encoder 20 may be configured to determine the reference neighboring samples used in equations (2) and (3) to derive the LIC parameters (e.g., the weight and offset) that are not adjacent to the reference block. Said differently for example, video decoder 30 and/or video encoder 20 may be configured to determine the reference neighboring samples that are not adjacent to a reference block for the current block.

Figure 17:
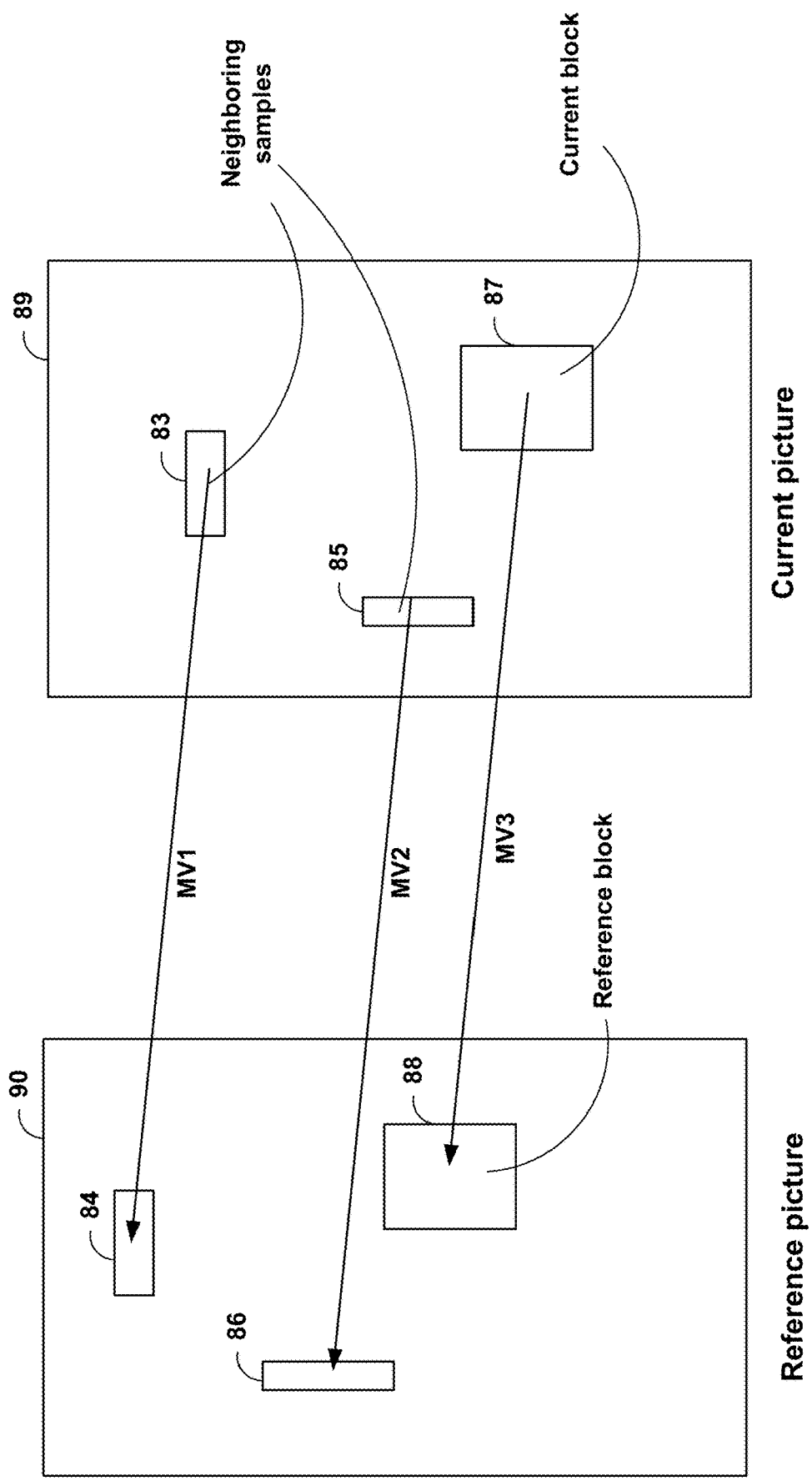
FIG. 17 is a conceptual diagram illustrating an example of locating the reference neighboring with the MV of the current block.

In the example of FIG. 17, video decoder 30 and/or video encoder 20 may be configured to locate reference neighboring samples by the neighboring samples with the motion vector (MV) of the current block. For example, video decoder 30 and/or video encoder 20 may be configured to locate reference neighboring samples 84 of reference picture 90 by neighboring samples 83 with the motion vector (MV1) of current block 89. In this example, video decoder 30 and/or video encoder 20 may be configured to locate reference neighboring samples 86 of reference picture 90 by neighboring samples 85 with the motion vector (MV2) of current block 89. Similarly, video decoder 30 and/or video encoder 20 may be configured to locate reference neighboring samples 88 of reference picture 90 by neighboring samples 87 with the motion vector (MV3) of current block 89.

Video decoder 30 and/or video encoder 20 may be configured to round the located reference neighboring samples to integer pixels if they sit at sub-pixels. For example, video decoder 30 and/or video encoder 20 may be configured to round a reference neighboring sample of reference neighboring samples to integer pixels when the reference neighboring sample is arranged at a sub-pixel.

Video decoder 30 and/or video encoder 20 may be configured to apply LIC only if the adjacent above samples of current block or the adjacent left samples of the current block, or both, are outside of the current LCU. In some examples, video decoder 30 and/or video encoder 20 may be configured to disabled LIC for blocks that are not adjacent above samples of current block or the adjacent left samples of the current block, or both. For example, video encoder 20 may be configured to determine to apply local illumination compensation for the current block in response to adjacent above samples of the current block, adjacent left samples of the current block, or both, being arranged outside of a current LCU for the current block, where deriving local illumination compensation information for a current block is in response to determining to apply local illumination compensation for the current block. In some examples, video encoder 20 may be configured to refrain from signaling an IC_flag for blocks that are not adjacent above samples of current block or the adjacent left samples of the current block, or both.

Figure 18:
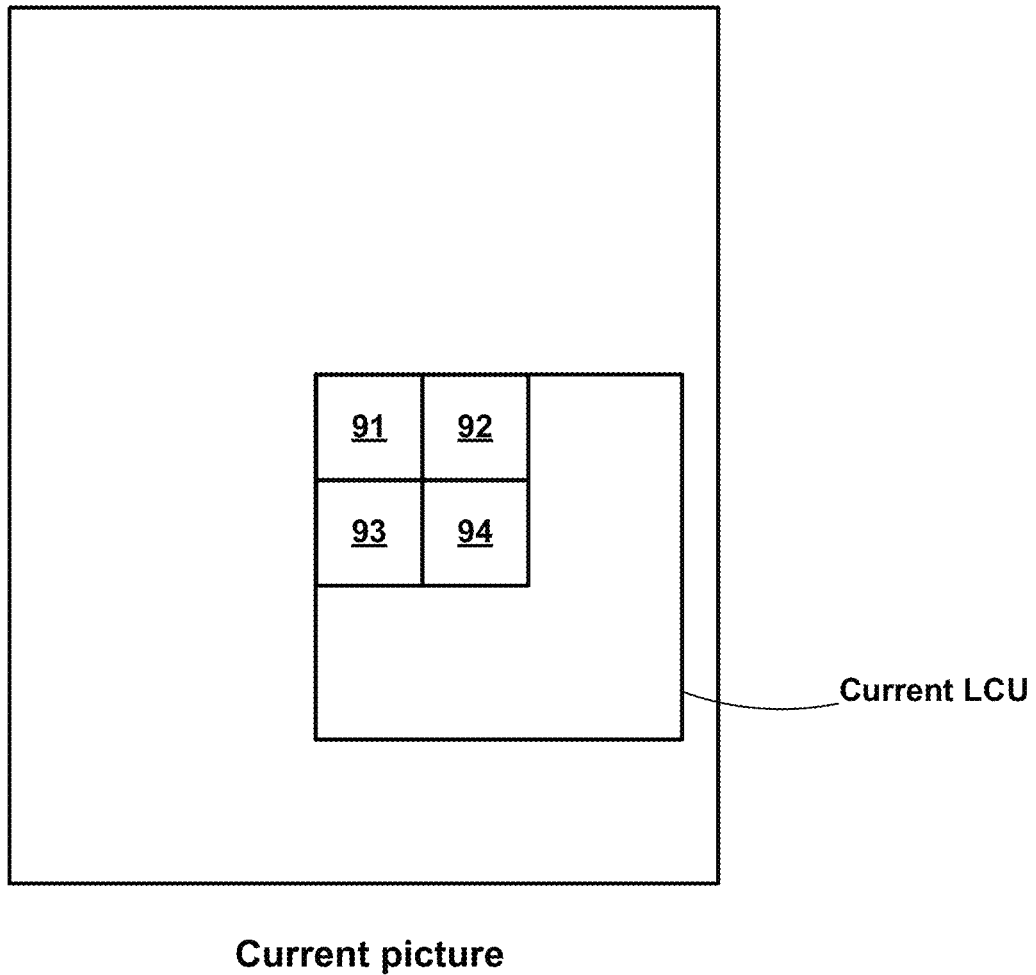
FIG. 18 is a conceptual diagram illustrating an example of LIC enabling/disabling based on block position.

In the example of FIG. 18, video decoder 30 and/or video encoder 20 may be configured to determine to apply LIC for block 91 in response to determining that block 91 has neighboring samples adjacent above and neighboring samples adjacent left that are outside of the current LCU. Video decoder 30 and/or video encoder 20 may be configured to determine to apply LIC for block 92 in response to determining that block 92 has neighboring samples adjacent above that are outside of the current LCU. Video decoder 30 and/or video encoder 20 may be configured to determine to apply LIC for block 93 in response to determining that block 93 has neighboring samples adjacent left that are outside of the current LCU. In this example, however, video decoder 30 and/or video encoder 20 may be configured to determine to not to apply LIC for block 94 in response to determining that block 94 does not have neighboring samples adjacent above or neighboring samples adjacent left that are outside of the current LCU.

Said differently, for example, video decoder 30 and/or video encoder 20 may be configured to determine whether to apply LIC for a block based on a position of the block within a current LCU. In response to determining the current block is arranged within the LCU such that the current block has neighboring samples immediately adjacent above and/or neighboring samples immediately adjacent left that are outside of the current LCU, video decoder 30 and/or video encoder 20 may be configured to determine to apply LIC for the block. In response, however, to determining the current block is arranged within the LCU such that the current block does not have neighboring samples immediately adjacent above or neighboring samples immediately adjacent left that are outside of the current LCU, video decoder 30 and/or video encoder 20 may be configured to determine to not apply LIC for the block.

Figure 19:
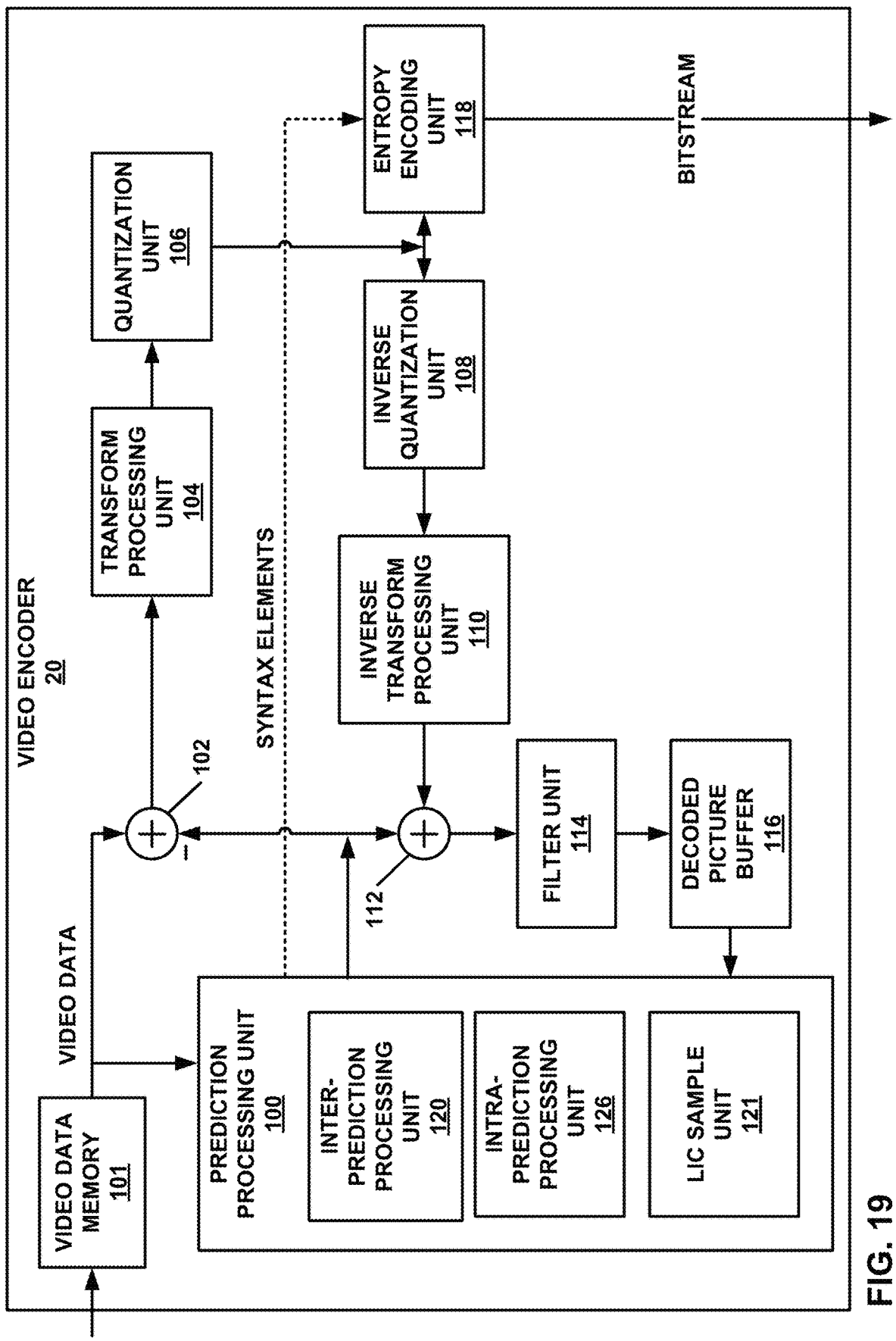
FIG. 19 is a block diagram illustrating an example video encoder that may implement one or more techniques described in this disclosure.

FIG. 19 is a block diagram illustrating an example video encoder 20 that may implement the techniques of this disclosure. FIG. 19 is provided for purposes of explanation and should not be considered limiting of the techniques as broadly exemplified and described in this disclosure. The techniques of this disclosure may be applicable to various coding standards or methods.

In the example of FIG. 19, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may process encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs.

For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU. JEM/VVC also provides an affine motion compensation mode, which may be considered an inter-prediction mode.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

LIC sample unit 121 of prediction processing unit 100 may determine neighboring samples for predicting a current block, where the neighboring samples are arranged outside of a region of a current picture, the region comprising the current block, a row of samples adjacent to a top row of the current block, and a column of samples adjacent to a left column of the current block. LIC sample unit 121 may derive local illumination compensation information for the current block using the neighboring samples. Prediction processing unit 100 (e.g., inter-prediction processing unit 120) may generate a prediction block using the local illumination compensation information derived by multiple-model LIC sample unit 121.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 20:
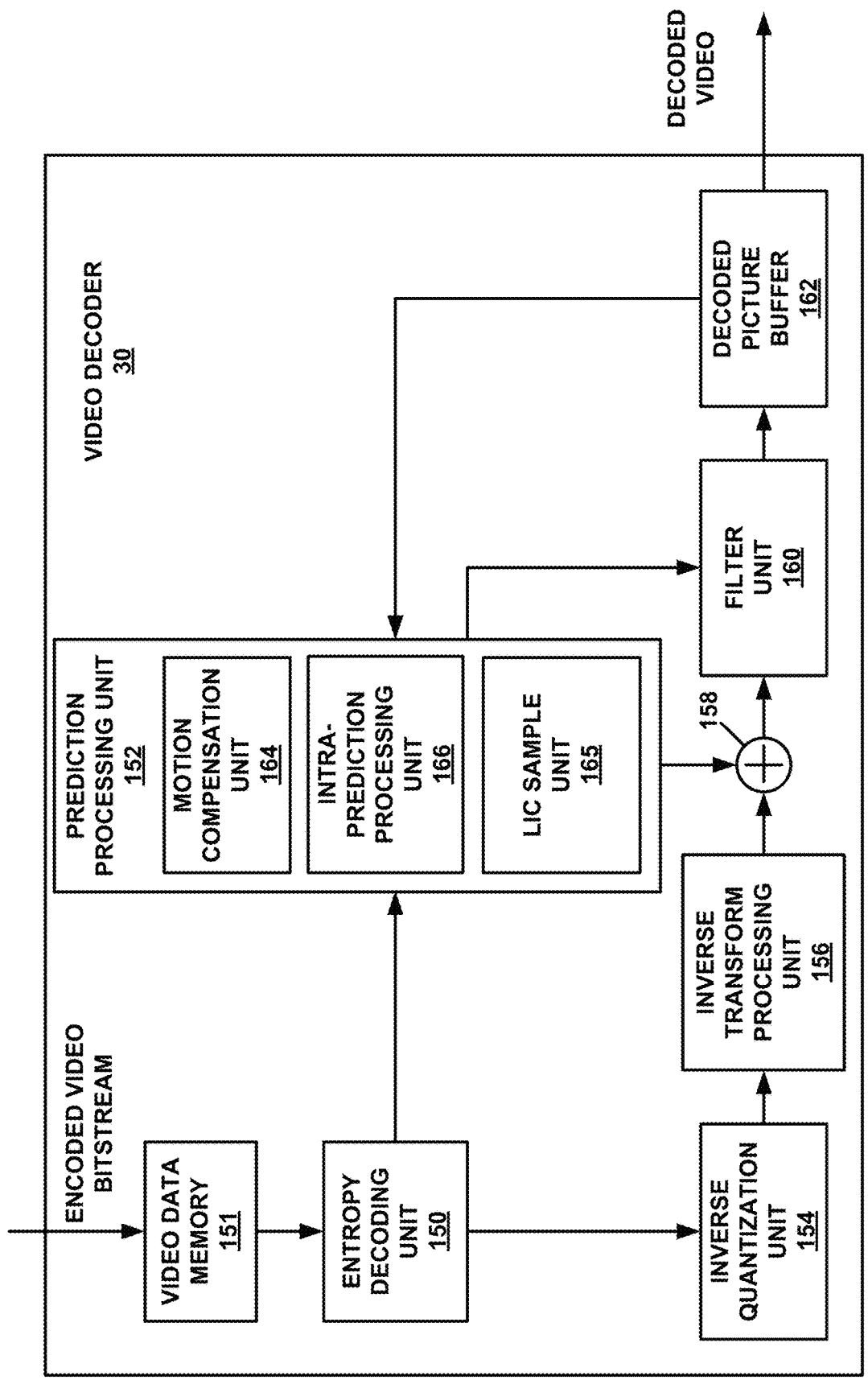
FIG. 20 is a block diagram illustrating an example video decoder that may implement one or more techniques described in this disclosure.

FIG. 20 is a block diagram illustrating an example video decoder 30 that is configured to implement the techniques of this disclosure. FIG. 20 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 20, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160)

may reconstruct, based on inverse quantized transform coefficients of the transform block, a coding block of the CU.

LIC sample unit 165 of prediction processing unit 152 may determine neighboring samples for predicting a current block, where the neighboring samples are arranged outside of a region of a current picture, the region comprising the current block, a row of samples adjacent to a top row of the current block, and a column of samples adjacent to a left column of the current block. LIC sample unit 165 may derive local illumination compensation information for the current block using the neighboring samples. Prediction processing unit 152 (e.g., intra-prediction processing unit 166) may generate a prediction block using the local illumination compensation information derived by LIC sample unit 165.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 21:
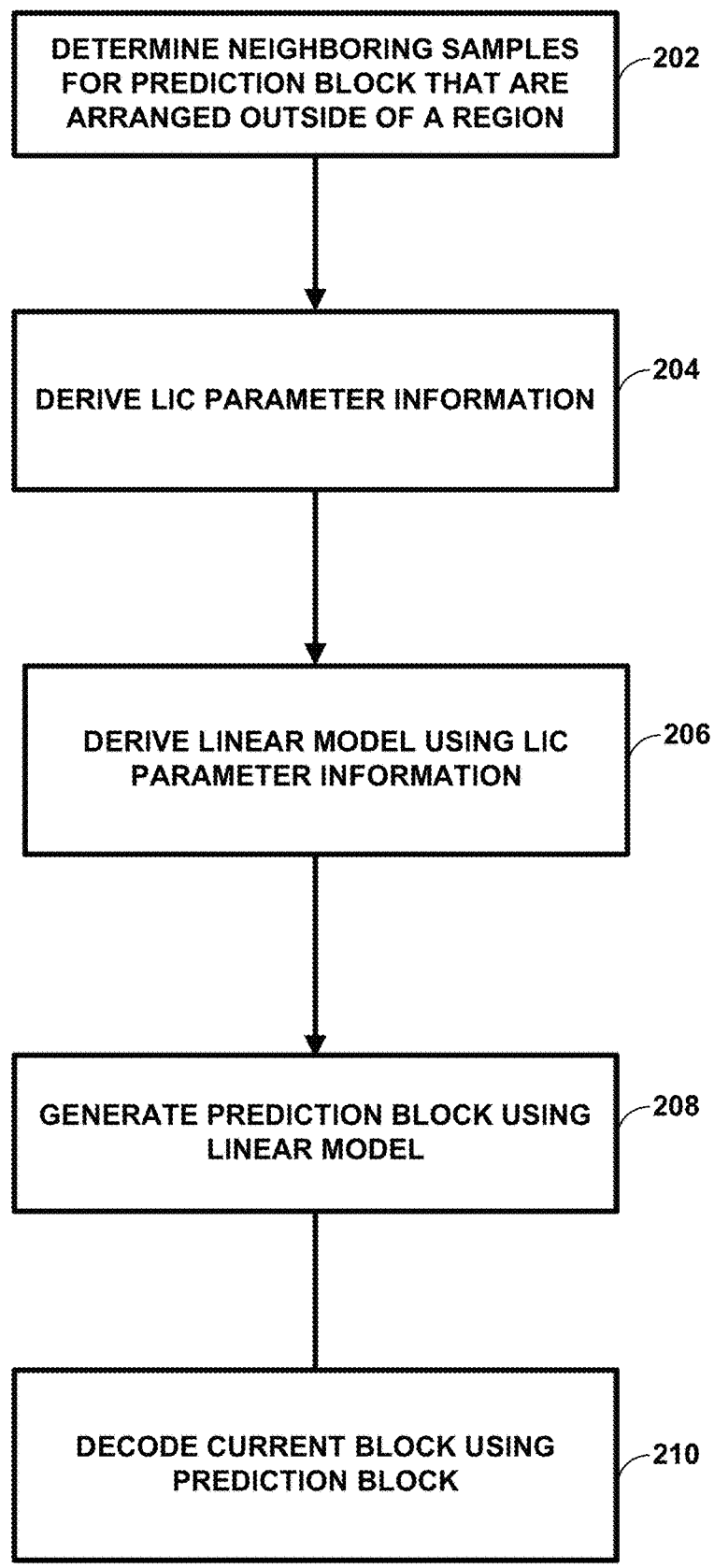
FIG. 21 is a flowchart illustrating techniques for decoding video data using neighboring samples determined to be available for deriving local illumination compensation information with multiple linear models.

FIG. 21 is a flowchart illustrating techniques for decoding video data using neighboring samples determined to be available for deriving local illumination compensation information with multiple linear models. The current block may include a current CU or a portion of the current CU. Although described with respect to video decoder 30, it should be understood that other devices may be configured to perform a method similar to that of FIG. 21.

In the example of FIG. 21, LIC sample unit 165 determines neighboring samples for a prediction block that are arranged outside of a region (202). LIC sample unit 165 derives LIC parameter information (204). LIC sample unit 165 derives a linear model using the LIC parameter information (206). Prediction processing unit 152 generates a prediction block using the linear model (208). Video decoder 30 decodes the current block using the prediction block (210).

Figure 22:
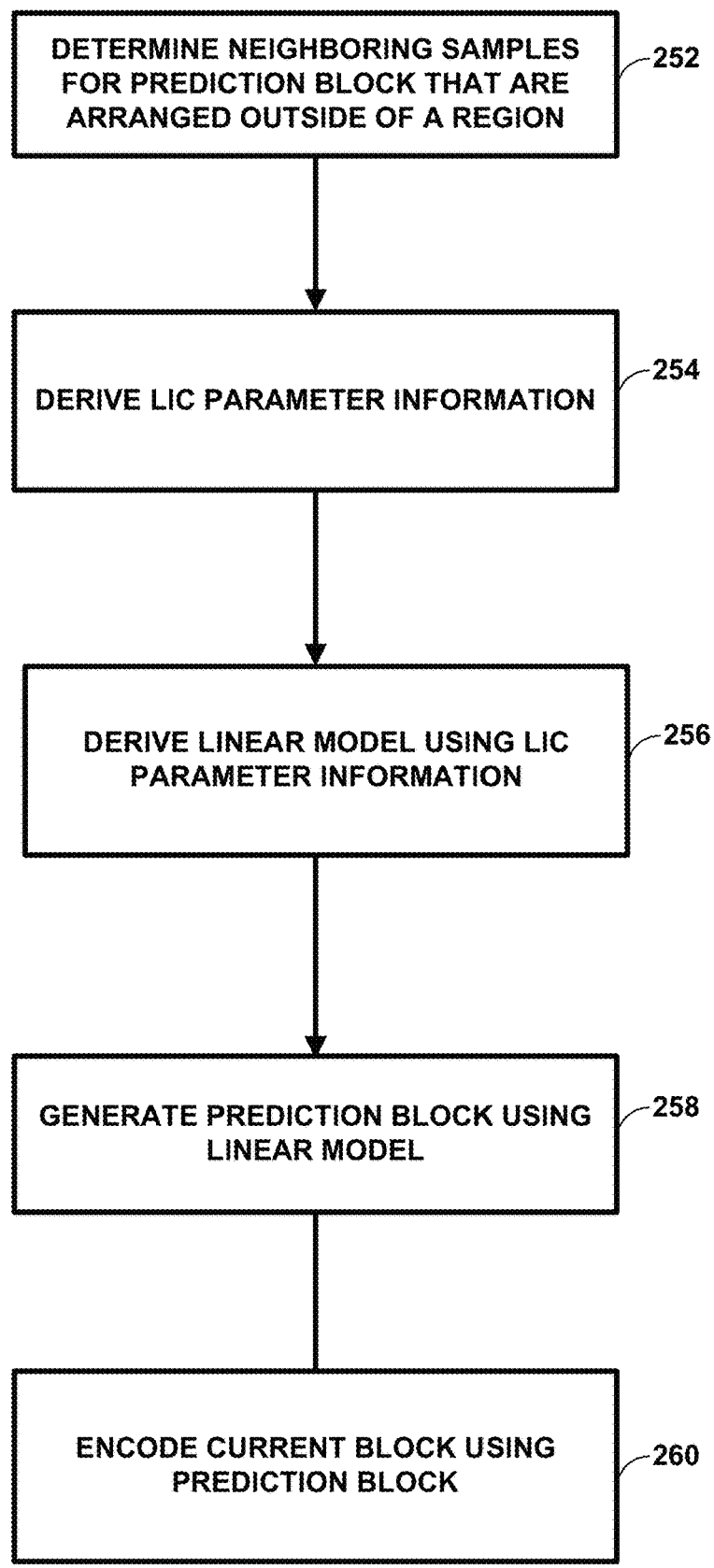
FIG. 22 is a flowchart illustrating techniques for encoding video data using neighboring samples determined to be available for deriving local illumination compensation information with multiple linear models.

FIG. 22 is a flowchart illustrating techniques for encoding video data using neighboring samples determined to be available for deriving local illumination compensation information with multiple linear models. The current block may include a current CU or a portion of the current CU. Although described with respect to video encoder 20, it should be understood that other devices may be configured to perform a method similar to that of FIG. 22.

In the example of FIG. 22, LIC sample unit 121 determines neighboring samples for a prediction block that are arranged outside of a region (252). LIC sample unit 121 derives LIC parameter information (254). LIC sample unit 121 derives a linear model using the LIC parameter information (256). LIC sample unit 121 generates a prediction block using the linear model (258). Video encoder 20 encodes the current block using the prediction block (260).

Using one or more techniques described herein for determining neighboring samples for deriving local illumination compensation information that are outside of a region comprising the current block, video encoder 20 and/or video decoder 30 may be configured to derive a prediction block for a current block with less delay compared to systems that use neighboring samples that are immediately adjacent to the current block to derive local illumination compensation information. For example, video encoder 20 and/or video decoder 30 may be configured to determine a plurality of neighboring samples for predicting a current block, wherein the plurality of neighboring samples are arranged outside of a region of a current picture, the region comprising the current block, a row of samples adjacent to a top row of the current block, and a column of samples adjacent to a left column of the current block, derive local illumination compensation information for the current block using the plurality of neighboring samples, and generate a prediction block using the local illumination compensation information. Reducing delay in generating the prediction block may increase a processing speed of video encoder 20 and/or video decoder 30 and/or reduce a power consumption of video encoder 20 and/or video decoder 30.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by fixed function and/or programmable processing circuitry, including one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    determining, by processing circuitry, a plurality of neighboring samples of a current picture, the current picture comprising a current block;
    determining, by the processing circuitry, a plurality of reference neighboring samples of a reference picture, the reference picture comprising a reference block, wherein determining the plurality of reference neighboring samples comprises rounding a sub-pixel value to an integer pixel value to determine a reference neighboring sample of the plurality of reference neighboring samples;
    deriving, by the processing circuitry, local illumination compensation information for the current block using the plurality of neighboring samples and the plurality of reference neighboring samples; and
    generating, by the processing circuitry, a prediction block using the local illumination compensation information.

2. The method of claim 1, further comprising:
    determining a motion vector for the current block; and
    determining the plurality of reference neighboring samples based on the motion vector.

3. The method of claim 2, wherein the plurality of neighboring samples comprise a first set of neighboring samples arranged in a row and a second set of neighboring samples arranged in a column, wherein the plurality of reference neighboring samples comprise a first set of reference neighboring samples arranged in the row and a second set of reference neighboring samples arranged in the column, and wherein determining the plurality of reference neighboring samples comprises:
    determining the first set of reference neighboring samples using the first set of neighboring samples and the motion vector of the current block; and
    determining the second set of reference neighboring samples using the second set of neighboring samples and the motion vector of the current block.

4. The method of claim 1, wherein deriving the local illumination compensation information comprises calculating a weight and/or offset using the plurality of neighboring samples and the plurality of reference neighboring samples.

5. The method of claim 1, wherein deriving the local illumination compensation information comprises calculating a and/or b, wherein $$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2},$$

wherein $b = \dfrac{\sum_{i=0}^{2N-1} Rec_{neig}(i) - a \cdot \sum_{i=0}^{2N-1} Rec_{refneig}(i)}{2N}$, and
wherein $Rec_{neig}$ denotes the plurality of neighboring samples, wherein $Rec_{refneig}$ denotes the plurality of reference neighboring samples, and wherein N denotes a pixel number in $Rec_{neig}$ and $Rec_{refneig}$.

6. The method of claim 1, wherein the plurality of reference neighboring samples are adjacent to the reference block.

7. The method of claim 1, wherein the plurality of reference neighboring samples are not adjacent to the reference block.

8. The method of claim 1, further comprising determining, by the processing circuitry, to apply local illumination compensation for the current block in response to adjacent above samples of the current block, adjacent left samples of the current block, or both, being arranged outside of a current largest coding unit (LCU) for the current block, wherein deriving the local illumination compensation information for the current block is in response to determining to apply the local illumination compensation for the current block.

9. The method of claim 1, wherein processing comprises encoding, the method further comprising:
generating, by the processing circuitry, a residual block for the current block of the video data based on differences between the current block and the prediction block; and
outputting, by the processing circuitry, the residual block.

10. The method of claim 1, wherein processing comprises decoding, the method further comprising:
decoding, by the processing circuitry, a residual block for the current block;
combining, by the processing circuitry, the prediction block and the residual block to decode the current block; and
outputting, by the processing circuitry, the current block.

11. An apparatus for processing video data, the apparatus comprising:
one or more storage media configured to store the video data; and
one or more processors implemented in circuitry and configured to:
determine a plurality of neighboring samples of a current picture, the current picture comprising a current block;
determine a plurality of reference neighboring samples of a reference picture, the reference picture comprising a reference block, wherein, to determine the plurality of reference neighboring samples, the one or more processors are configured to round a sub-pixel value to an integer pixel value to determine a reference neighboring sample of the plurality of reference neighboring samples;
derive local illumination compensation information for the current block using the plurality of neighboring samples and the plurality of reference neighboring samples; and
generate a prediction block using the local illumination compensation information.

12. The apparatus of claim 11, wherein the one or more processors are further configured to:
determine a motion vector for the current block; and
determine the plurality of reference neighboring samples based on the motion vector.

13. The apparatus of claim 11, wherein, to derive the local illumination compensation information, the one or more processors are configured to calculate a weight and/or offset using the plurality of neighboring samples and the plurality of reference neighboring samples.

14. The apparatus of claim 11, wherein, to derive the local illumination compensation information, the one or more processors are configured to calculate a and/or b, wherein $$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2},$$

wherein $b = \dfrac{\sum_{i=0}^{2N-1} Rec_{neig}(i) - a \cdot \sum_{i=0}^{2N-1} Rec_{refneig}(i)}{2N}$, and
wherein $Rec_{neig}$ denotes the plurality of neighboring samples, wherein $Rec_{refneig}$ denotes the plurality of reference neighboring samples, and wherein N denotes a pixel number in $Rec_{neig}$ and $Rec_{refneig}$.

15. The apparatus of claim 11, wherein the plurality of reference neighboring samples are adjacent to the reference block.

16. The apparatus of claim 11, wherein the plurality of reference neighboring samples are not adjacent to the reference block.

17. The apparatus of claim 11, wherein the one or more processors are further configured to determine to apply local illumination compensation for the current block in response to a determination that adjacent above samples of the current block, adjacent left samples of the current block, or both, are arranged outside of a current largest coding unit (LCU) for the current block, wherein the one or more processors are configured to derive the local illumination compensation information for the current block in response to the determination to apply the local illumination compensation for the current block.

18. The apparatus of claim 11, wherein the apparatus comprises a wireless communication device, further comprising a transmitter configured to transmit encoded video data.

19. The apparatus of claim 11, wherein the apparatus comprises a wireless communication device, further comprising a receiver configured to receive encoded video data.

20. A non-transitory computer-readable storage medium storing instructions that, when executed, cause one or more processors to:
   determine a plurality of neighboring samples of a current picture, the current picture comprising a current block;
   determine a plurality of reference neighboring samples of a reference picture, the reference picture comprising a reference block, wherein, to determine the plurality of reference neighboring samples, the instructions further cause the one or more processors to round a sub-pixel value to an integer pixel value to determine a reference neighboring sample of the plurality of reference neighboring samples;
   derive local illumination compensation information for the current block using the plurality of neighboring samples and the plurality of reference neighboring samples; and
   generate a prediction block using the local illumination compensation information.

* * * * *